(12) United States Patent
Kandori et al.

(10) Patent No.: US 8,336,381 B2
(45) Date of Patent: Dec. 25, 2012

(54) SENSOR AND METHOD OF MANUFACTURING THE SAME

(75) Inventors: Atsushi Kandori, Ebina (JP); Masao Majima, Isehara (JP); Kenichi Nagae, Yokohama (JP); Yasuyoshi Takai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 12/516,007

(22) PCT Filed: Nov. 29, 2007

(86) PCT No.: PCT/JP2007/073617
§ 371 (c)(1),
(2), (4) Date: May 22, 2009

(87) PCT Pub. No.: WO2008/069284
PCT Pub. Date: Jun. 12, 2008

(65) Prior Publication Data
US 2010/0043546 A1 Feb. 25, 2010

(30) Foreign Application Priority Data
Dec. 4, 2006 (JP) ................................ 2006-326401
Oct. 15, 2007 (JP) ................................ 2007-267308

(51) Int. Cl.
*G01C 19/00* (2006.01)
(52) U.S. Cl. .................................................. 73/504.12
(58) Field of Classification Search ............... 73/504.03, 73/504.04, 504.12, 504.14, 504.15, 514.36
See application file for complete search history.

(56) References Cited

U.S. PATENT DOCUMENTS

| | | | | |
|---|---|---|---|---|
| 3,440,873 A | * | 4/1969 | Eichelberger | 73/862.68 |
| 3,585,415 A | * | 6/1971 | Muller et al. | 310/319 |
| 4,773,972 A | | 9/1988 | Mikkor | 156/89.15 |
| 4,812,888 A | | 3/1989 | Blackburn | 257/254 |
| 5,572,057 A | | 11/1996 | Yamamoto et al. | 257/417 |
| 2002/0174715 A1 | * | 11/2002 | Kim et al. | 73/105 |
| 2005/0194651 A1 | | 9/2005 | Ohashi | 257/415 |
| 2006/0208327 A1 | * | 9/2006 | Yamaguchi | 257/414 |
| 2008/0006093 A1 | * | 1/2008 | Ueya | 73/724 |

FOREIGN PATENT DOCUMENTS

| | | |
|---|---|---|
| JP | H05-54705 | 5/1986 |
| JP | 61-155831 | 7/1986 |

(Continued)

OTHER PUBLICATIONS

Office Action issued Jun. 27, 2012 in counterpart Japanese Patent Application No. 2007-267308, with translation.

*Primary Examiner* — Eric S McCall
(74) *Attorney, Agent, or Firm* — Fitzpatrick, Cella, Harper & Scinto

(57) ABSTRACT

A sensor includes a movably supported movable element and an opposing member, and sensor detects a relative positional relationship between the movable element and the opposing member which are provided with a spacing therebetween. The opposing member has an impurity-doped portion which is provided at either an opposing portion, which is opposed to the movable element, or an adjoining portion, which adjoins the opposing portion. At least a part of the impurity-doped portion is formed on an opposite surface (that is, opposite to a surface that faces the movable element), from which opposite surface an electrical wiring is led out.

10 Claims, 16 Drawing Sheets

FOREIGN PATENT DOCUMENTS

| | | |
|---|---|---|
| JP | 63-117233 | 5/1988 |
| JP | H04-25764 | 1/1992 |
| JP | H08-50022 | 2/1996 |
| JP | 10-111203 | 4/1998 |
| JP | 11-317474 | 11/1999 |
| JP | 2000-065581 | 3/2000 |
| JP | 2002-148047 | 5/2002 |
| JP | 2005-262412 | 9/2005 |

* cited by examiner

SENSOR AND METHOD OF MANUFACTURING THE SAME

TECHNICAL FIELD

The present invention relates to a sensor for detecting a displacement of a movable element or of an oscillator, such as a pressure sensor, an acceleration sensor, and an angular velocity sensor, and to a method of manufacturing the same. In particular, the present invention relates to a sensor characterized by the structure of a unit for detecting a displacement of a movable element, and to a method of manufacturing the same.

BACKGROUND ART

Conventionally, a pressure sensor, an acceleration sensor, an angular velocity sensor, and the like manufactured by micro-electro-mechanical systems (MEMS) technology to which a semiconductor process is applied detect a displacement of a movable element so as to detect a physical quantity (pressure, acceleration, angular velocity, and the like). In general, a change in electrostatic coupling capacitance formed between the movable element and a fixed surface is measured, thereby measuring a distance between the movable element and the fixed surface. Based on a displacement amount of the movable element thus obtained, the physical quantity to be measured can be detected.

On the other hand, Japanese Patent Application Laid-Open Nos. H04-25764 and H08-50022 each propose a sensor for detecting the displacement of the movable element by use of a field-effect transistor (FET) in which a gate of a metal-oxide-semiconductor field-effect transistor (MOSFET) has a suspended-gate structure (hereinafter, referred to as "SG-FET"). FIGS. 10A and 10B are a plan diagram and a cross-sectional diagram, respectively, of the sensor disclosed in Japanese Patent Application Laid-Open No. H04-25764. FIG. 11 is a cross-sectional diagram of the sensor disclosed in Japanese Patent Application Laid-Open No. H08-50022. The SG-FET includes a substrate having a source region and a drain region of the transistor formed thereon, and a movable element formed with a predetermined spacing from a surface of the substrate and having a certain potential. In this case, when the movable element is displaced according to the physical quantity to be detected, the amount of current that flows into a channel between the source region and the drain region is changed correspondingly, thereby measuring an amount of change to detect the displacement of the movable element. In this method, the displacement of the movable element can be directly detected, with the result that degradation of a detection signal due to a wiring extending to a first-stage amplifier circuit can be prevented, and an effect of superimposed noise can be reduced. Further, a small displacement of the movable element can be detected with high sensitivity.

Japanese Patent Application Laid-Open No. H04-25764 discloses such a structure, illustrated in FIGS. 10A and 10B herein, that can be obtained by a method of forming the sensor in which a substrate 1 having a movable element (cantilever 2) formed thereon, and a substrate 7 having a source region (source electrode 8) and a drain region (drain electrode 9) formed thereon are bonded together. (Element 3 is a gate electrode, 4, 5 and 6 denote wiring, 10 is a groove, and 11 denotes the package.) Japanese Patent Application Laid-Open No. H08-50022 discloses a structure, illustrated in FIG. 11 herein, in which a movable portion 13 includes a movable element 16 that is held above a substrate 12, which has a source region 20 and a drain region 21 (connected by channel 28, which is covered by insulated film 22) formed thereon, in a state where the movable element 16 is suspended above the substrate 12. Connections S, D and G for the source, drain and gate are shown, and an electrode 26 is provided on the back of the substrate.

DISCLOSURE OF THE INVENTION

In the case of detecting the displacement of the movable element, it is necessary to form a wiring for extracting a detection signal. For this reason, when an entire sensor must be limited to a certain size, it is necessary to reduce the region used for the movable element by the amount of the region in which the wiring is to be formed so as to make the movable element itself smaller. Further, due to the formation of the wiring, there may be limitations on the shape of the movable element, the shape of a member for supporting the movable element, and the arrangement thereof. In this case, the sensitivity of the sensor is improved as the movable element is more largely displaced with respect to the same external force. Accordingly, the sensitivity is determined based on the degree with which the shape and the arrangement of the movable element and the shape of the member for supporting the movable element are set so that the effect of the external force to be measured can be easily obtained. In an acceleration sensor or angular velocity sensor, the sensitivity is improved as the size of the movable element is increased. In view of the above, when it is necessary to secure the region for forming the wiring, the region which can be used for the movable element is reduced, and the shape and the arrangement of each of the movable element and the supporting member are not optimized, which makes it difficult to improve the sensitivity of the sensor.

On the other hand, the wiring for extracting the detection signal may be led out from a back surface of the sensor, which is opposite to a surface which is opposed to the movable element. As a result, there is no need to reduce the size of the movable element so as to secure the arrangement of the wiring, and it can be expected that a sensor with high sensitivity can be achieved. However, when this structure is to be applied to the above-mentioned conventional sensor, it is necessary to use a wiring which passes through the substrate, such as a through hole, thereby complicating the sensor structure and the manufacturing process thereof. In other words, in a case of forming the through hole by plating, the sensor has a shape which is convex at its center. As a result, in consideration of the reliability of the contact between the detection electrode and the through hole, it is necessary to form a plating so as to protrude from the substrate to some extent, to be subjected to polishing or the like in some cases. Further, when the polishing is not performed, it is necessary to increase the distance between the movable element and the detection electrode by an amount corresponding to the protrusion of the plating, which may lower the detection sensitivity of the sensor. In addition, in a case of using the SG-FET, there is a risk that the detection characteristics may be affected by contamination with ions used for plating or the like, which may change the detection signal to a large extent. Further, in order to detect the displacement of the movable element, it is necessary to provide a detecting unit on the surface opposed to the movable element. As described in the "TECHNICAL FIELD" section, the method of detecting the capacitance between planes and the method using the SG-FET may be employed for the detecting unit. In both methods, it is necessary to form electrodes, or source, drain, and channel regions of the SG-FET on a substrate, and then deposit the movable element on the substrate through a sacrifice layer, or bond, to the substrate, a substrate having the movable element fabricated therein.

However, in a case of depositing the members of the movable element, it is difficult to increase the thickness of the movable element and to improve the sensitivity, due to the constraints of the film formation time and the stress imposed on the film. Further, in the case of bonding the movable element, there is a risk that an arrangement error may occur at the time of bonding, lowering the sensitivity of the sensor. In addition, there is a risk that part of the device characteristics of the electrodes or the SG-FET may deteriorate, depending on a necessary temperature or voltage at the time of bonding (joining) the movable element, thereby lowering the sensitivity. In any case, the shape of the movable element, the shape and the arrangement of the member for supporting the movable element are restricted due to the constraints of the film forming process on the substrate and of the process executed at the time of bonding, which makes it difficult to carry out a flexible design for obtaining a sensor with high sensitivity.

In view of the above-mentioned problems, a sensor according to the present invention includes a movable element and an opposing member and detects a relative positional relationship between the movable element and the opposing member which are provided with a spacing therebetween. In the sensor, the opposing member has an impurity ion implanted portion (which is also referred to as an impurity-doped portion), which is provided to either an opposing portion that is opposed to the movable element or an adjoining portion which adjoins the opposing portion, and at least a part of the impurity ion implanted portion is formed on a surface opposite to that which is opposed to the movable element, from which opposite surface an electrical wiring is led out.

Further, in view of the above-mentioned problems, there is provided a method of manufacturing the sensor according to the present invention described below. In a first step, a substrate having semiconductor layers and insulating layers which are alternately laminated thereon is prepared. In a second step, the movable element is formed by etching a first semiconductor layer using a first mask patterning. In a third step, impurity ions are implanted into a second semiconductor layer using a second mask patterning to form the impurity ion implanted portion of the opposing member. In a fourth step, a spacing (space) is formed between the movable element and the opposing member by etching an insulating layer sandwiched between the first semiconductor layer and the second semiconductor layer. In a fifth step, an electrical wiring is formed in at least a part of the impurity ion implanted portion provided on an opposite surface opposite to a surface which is opposed to the movable element.

According to the present invention, the wiring for extracting the detection signal is led out from a back surface, which is opposite to a surface that is opposed to the movable element. As a result, the structure on the same side as the movable element can be simply designed, and a sensor with a high sensitivity can be achieved. In addition, with a structure in which a gate region, a drain region, and a channel region in a structure of a field-effect transistor (FET) are formed in the opposing member which is opposed to the movable element, a sensor with higher performance can be achieved.

BEST MODE FOR CARRYING OUT THE INVENTION

Hereinafter, embodiments of the present invention will be described in detail with reference to the drawings.

First Embodiment

Figure 1A:
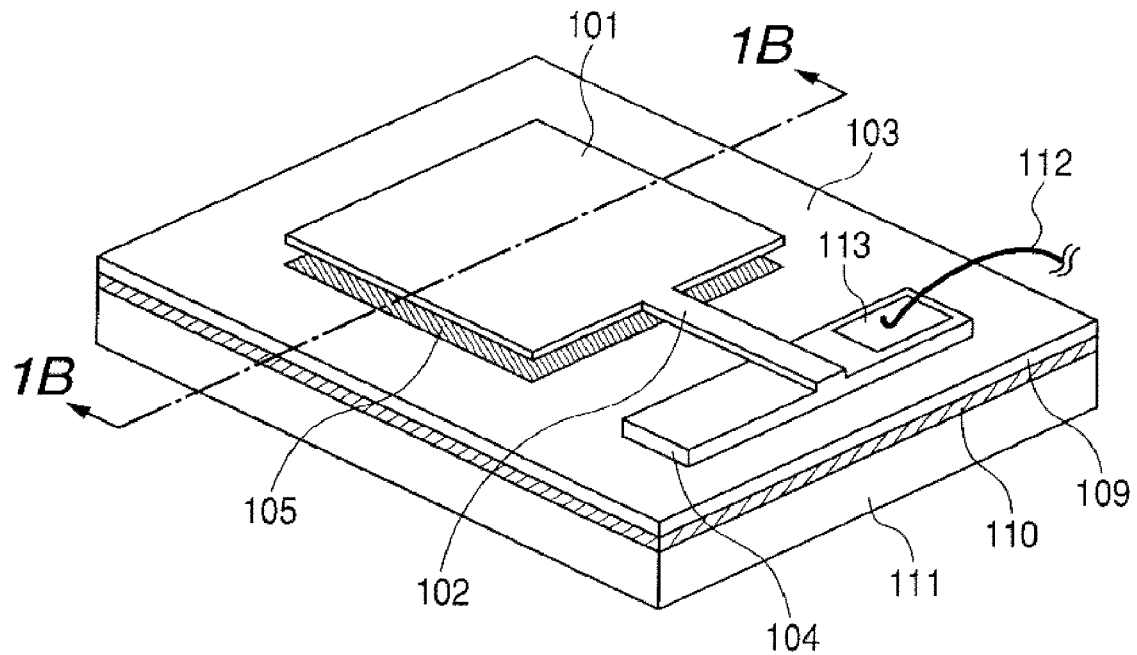
FIG. 1A is a perspective view for illustrating a sensor according to a first embodiment of the present invention.
Figure 1B:
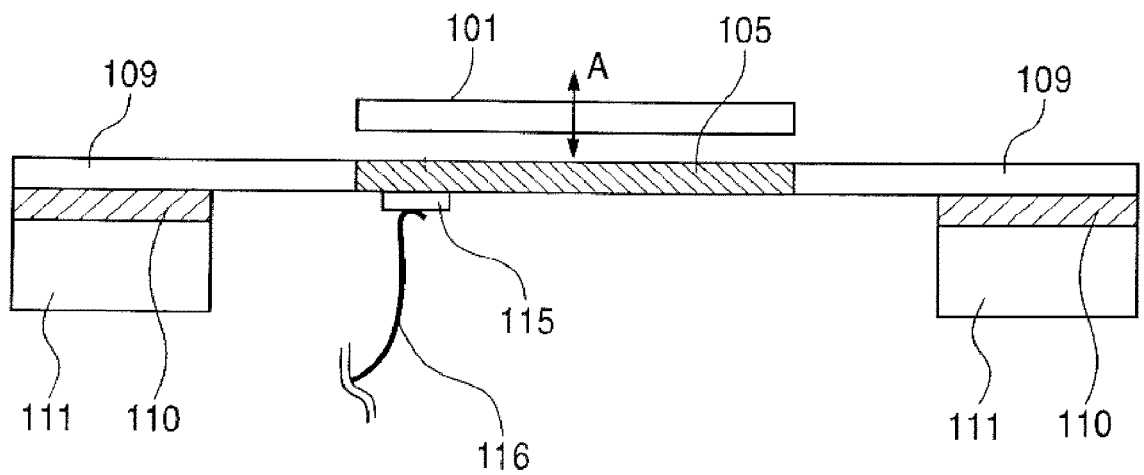
FIG. 1B is a cross-sectional diagram of the sensor according to the first embodiment.

With reference to FIGS. 1A and 1B, description is given of an acceleration sensor as an example according to a first embodiment of the present invention. FIG. 1A is a perspective view of the acceleration sensor according to the first embodiment, and FIG. 1B is a cross-sectional diagram of the acceleration sensor taken along the broken line 1B-1B of FIG. 1A. As illustrated in FIG. 1A, the acceleration sensor includes a movable element 101, a supporting beam 102 for movably supporting the movable element 101, a substrate member 103 serving as an opposing member provided so as to be opposed to the movable element 101, and a supporting portion 104 for supporting the supporting beam 102. A portion opposed to the movable element 101 of the opposing member is sometimes termed an "opposing portion" herein. In addition, the acceleration sensor includes a detection electrode 105 opposed to the movable element 101 with a predetermined spacing, an electrode forming substrate 109 having the detection electrode 105 formed therein, an insulating film 110, a supporting substrate 111, a wiring 112 to be led out from the supporting portion 104, and an electrode pad 113 provided on the supporting portion 104. Further, the acceleration sensor includes an electrode pad 115 formed on a back surface (that is, surface which is not opposed to movable element 101) of the detection electrode 105 on an opposite surface opposite to the surface opposed to the movable element 101, and a wiring 116 extending from the electrode pad 115. The substrate member 103 includes the electrode forming substrate 109, the insulating film 110, and the supporting substrate 111.

The sensor according to the first embodiment is characterized by having a structure in which the detection electrode 105 having the same thickness as the electrode forming substrate 109 is embedded in the electrode forming substrate 109, and there is provided the wiring 116 for extracting the detection signal of the detection electrode 105 from the surface which is not opposed to the movable element 101. The structure is described in detail below.

The movable element 101 is oscillatably supported by the supporting beam 102, and the supporting beam 102 is connected to the supporting portion 104 fixed onto the substrate member 103. In a state where nothing is acting on the movable element 101, there is a predetermined spacing between the movable element 101 and the substrate member 103. When something acts on the movable element 101 to deform the supporting beam 102, the movable element 101 can be displaced or oscillated in a direction indicated by the arrow A of FIG. 1B.

In this case, when an acceleration is input in a vertical direction of the substrate member 103 of the sensor, the movable element 101 is displaced upward (or downward) as indicated by the arrow A. As a result, the spacing between the movable element 101 and the substrate member 103 is changed from an initial spacing at the time when nothing is acting on the movable element 101. The change of the spacing is measured, thereby enabling detection of the acceleration input to the sensor. In other words, the acceleration is detected through detection of a relative positional relationship between the movable element 101 and the substrate member 103 serving as the opposing member which is provided with a spacing with respect to the movable element 101.

As an example of a method of measuring the change of the spacing between the movable element 101 and the substrate member 103, there is employed a method of measuring a change in capacitance formed therebetween. Specifically, in the first embodiment, the detection electrode 105 is formed in the substrate member 103, and the change in capacitance formed between the detection electrode 105 and the movable element 101 is detected. In this case, the detection electrode 105 has the same thickness as the electrode forming substrate 109, and the electrode pad 115 is formed on the surface of the electrode forming substrate 109, which is not opposed to the movable element 101. In such a structure, the detection signal of the detection electrode 105 is extracted using the wiring 116 extending from the electrode pad 115. When a certain potential is provided to the movable element 101 by using a power supply through the wiring 116 and the electrode pad 115, the spacing between the movable element 101 and the detection electrode 105 is reduced, with the result that the capacitance formed therebetween is increased and the detection signal is increased correspondingly. On the other hand, when the spacing between the movable element 101 and the detection electrode 105 is increased, the capacitance becomes smaller and the detection signal is reduced correspondingly. In this manner, a force is applied to the movable element 101 in accordance with the magnitude and the direction of the acceleration. As a result, the spacing between the movable element 101 and the detection electrode 105 is changed, and the detection signal reflecting the change is to be output. Accordingly, the magnitude and the direction of the acceleration can be detected based on the detection signal.

Here, the relative positional relationship according to the present invention refers to a relative positional relationship between the movable element 101 and the detection electrode 105. The present invention can be applied to a sensor for detecting not only a pressure and an acoustic wave but also an acceleration, an angular velocity, temperature, and the like, as long as the sensor detects the displacement of the movable element 101.

In the sensor according to the first embodiment, the wiring 116 can be led out, with a simple structure, from the back surface of the substrate member 103, for example, through the electrode pad. For this reason, the detection signal can be measured without affecting the shape and the size of the movable element 101 and the relative positional relationship between the movable element 101 and another member. As a result, as long as the movable element 101 has the same substrate area, the size of the movable element 101 can be increased with respect to the substrate area. With respect to the same acceleration, as the size (that is, mass) of the movable element is increased, the displacement of the movable element 101 is increased correspondingly. Accordingly, a sensor with high sensitivity can be provided. In addition, as an opposing area between the movable element 101 and the detection electrode 105 is increased, the capacitance to be used for the detection is increased correspondingly, which contributes to improvement of the sensitivity of the sensor. Further, in the first embodiment, a wiring for extracting the detection signal is not formed on a portion opposed to the movable element 101, so the movable element 101 and the wiring for extracting the detection signal hardly interact with each other and the detection signal is hardly degraded. Accordingly, detection can be performed with less detection error and with high accuracy. Further, the structure on the side at which the movable element 101 is present can be simplified, with the result that settings on the movable element 101 side including a setting of the spacing between the movable element 101 and the detection electrode 105 are easily performed with accuracy. This also contributes to the achievement of the detection with less detection error and with high accuracy.

In addition, even when multiple movable elements 101 are two-dimensionally provided on the substrate member 103 at intervals, the size of the movable element 101 can be increased and an error component due to the wiring is unlikely to be superimposed on the detection signal. Further, in a case where the wiring is formed on the back surface side, as compared with a case where the wiring is formed on the front surface side, a distance between wirings can be easily increased, thereby hardly causing crosstalk between wirings. As a result, it is also possible to provide sensors two-dimensionally provided with high sensitivity and with high accuracy.

Figure 1C:
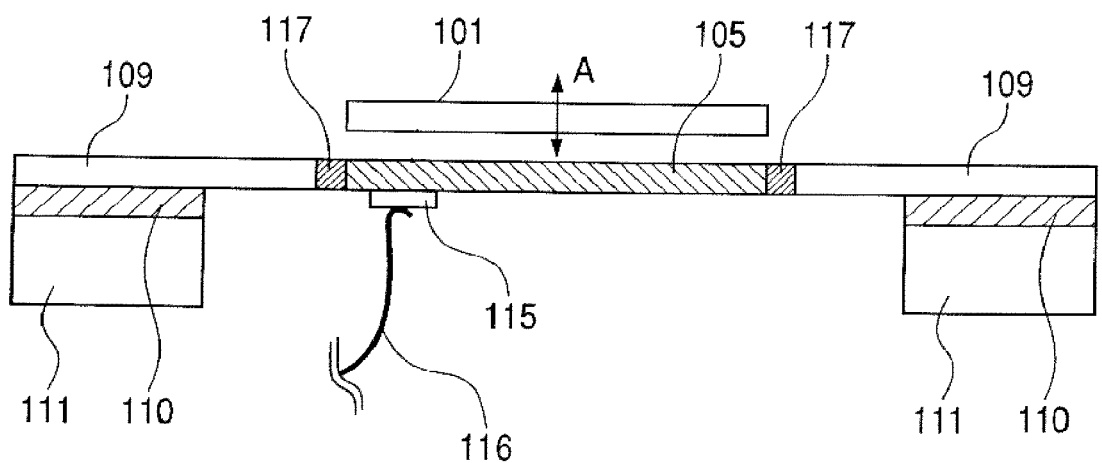
FIGS. 1C and 1D are cross-sectional diagrams for illustrating two modified examples of the sensor according to the first embodiment.
Figure 1D:
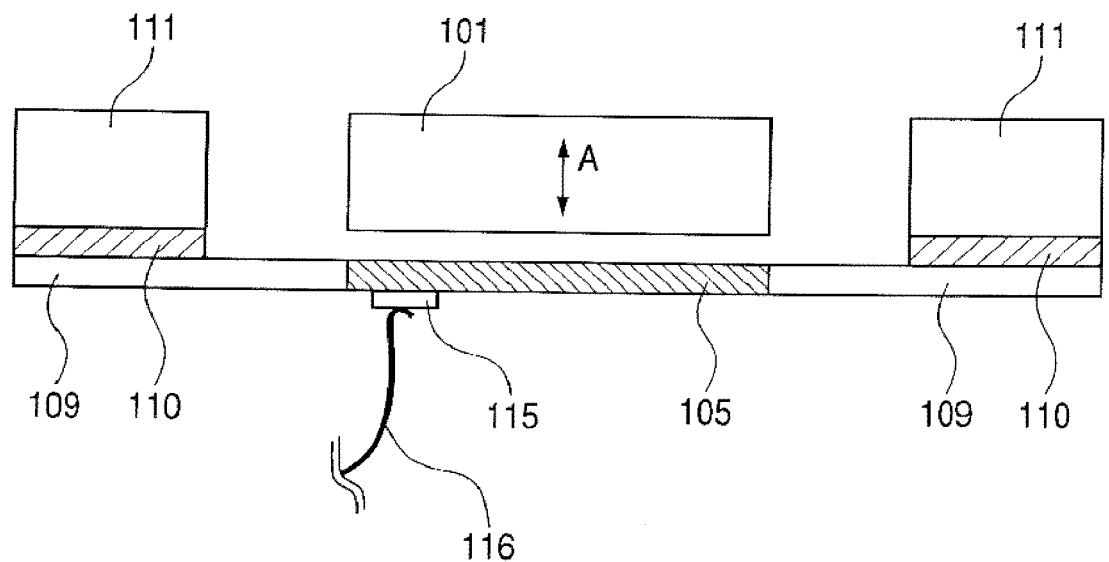

Next, with reference to FIGS. 1C and 1D, description is given of two modified examples of the sensor according to the first embodiment. FIGS. 1C and 1D are cross-sectional diagrams each illustrating the acceleration sensor of each of the modified examples.

The sensor of the modified example illustrated in FIG. 1C is different from the sensor of the first embodiment in that an insulating portion or an insulating film 117 is formed over the whole circumference (periphery) of the detection electrode 105. The other structures thereof are the same as those of the first embodiment. The insulating film 117 can be formed through such a process that, for example, a groove which penetrates the substrate 109 is formed in the periphery of the detection electrode 105, and an insulating material is filled in the groove. Provision of the insulating film 117 enables enhancement of insulation properties of the detection electrode 105 in the electrode forming substrate 109, with the result that noise is unlikely to be superimposed on the detection signal through the electrode forming substrate 109. Accordingly, it is possible to provide a sensor with higher accuracy.

The sensor of the modified example illustrated in FIG. 1D is different from the sensor of the first embodiment in that the supporting substrate 111 is provided on the movable element 101 side, and in that the thickness of the supporting substrate 111 is substantially the same as that of the movable element 101. The other structures thereof are the same as those of the first embodiment. With this structure, the thickness of the movable element 101 is increased and the mass thereof is increased correspondingly. As a result, the sensitivity for detecting the acceleration can be improved. Further, the supporting substrate 111 and the movable element 101 are provided on the same side of the detection electrode 105, so the thickness of the sensor can be reduced. In addition, the supporting substrate 111 surrounds the movable element 105, so the supporting substrate 111 has a function of protecting the movable element 105. Accordingly, it is possible to provide a sensor with higher reliability. Further, in a process of etching the same substrate, the supporting substrate 111 and the movable element 101 can be simultaneously formed, so the method of manufacturing the sensor is relatively simplified.

Description is given of a method of manufacturing the acceleration sensor according to the first embodiment. FIGS. 2A to 2E are cross-sectional diagrams illustrating a process of manufacturing the acceleration sensor according to the first embodiment. As illustrated in FIGS. 2A to 2E, the acceleration sensor includes a movable element forming semiconductor substrate 201 made of a silicon material or the like, an oxide film (insulating film) 202 made of oxide silicon or the like, an electrode forming semiconductor substrate 203 made of a silicon material or the like, an oxide film (insulating film) 204 made of oxide silicon or the like, and a supporting semiconductor substrate 205 made of a silicon material or the like of a p-type or an n-type with an impurity concentration of about $1.0 \times 10^{14}$ to $1.0 \times 10^{16}/cm^3$ (that is, about $1.0 \times 10^2$ to $1.0 \times 10^0$ Ωcm in resistivity). Further, the acceleration sensor also includes a detection electrode 206 and a movable element 207.

Hereinafter, the process is described in the order of steps.

Figure 2A:
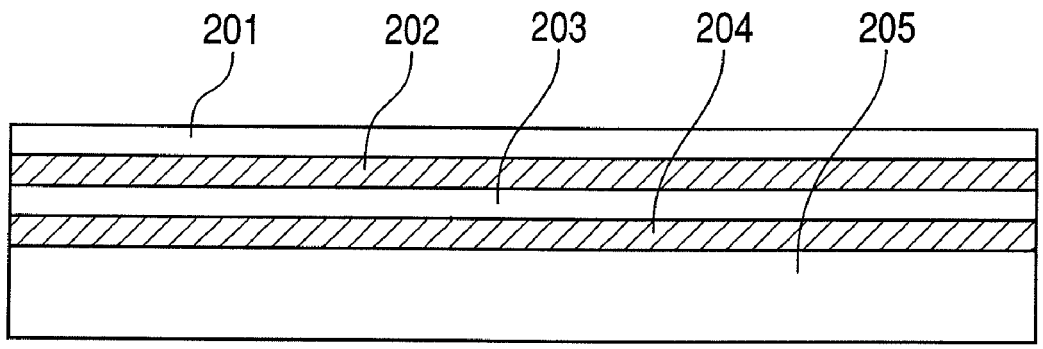
FIGS. 2A, 2B, 2C, 2D and 2E are cross-sectional diagrams for illustrating a method of manufacturing the sensor according to the first embodiment of the present invention.

FIG. 2A illustrates a substrate in an initial state. There is used a substrate having the oxide film 204, the electrode forming substrate 203, the oxide film 202, and the movable element forming substrate 201 which are formed on the supporting substrate 205 in the stated order. The substrate is a substrate (SOI substrate) which is prepared in the above-mentioned first step and which has the semiconductor layers and the insulating layers alternately laminated thereon. The substrate can be easily formed by joining multiple substrates each having an oxide film formed on an Si substrate.

Figure 2B:
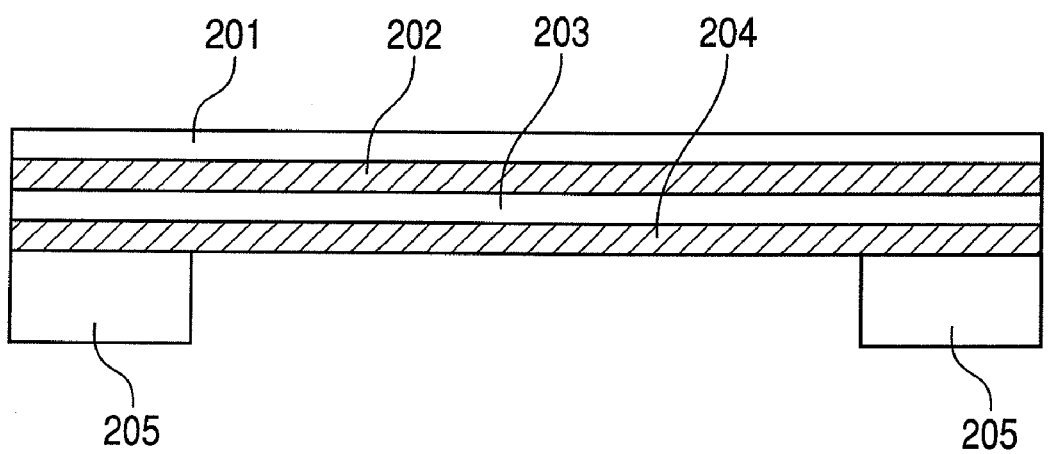

First, an appropriate mask pattern is formed by using photolithography, and then the supporting substrate 205 is subjected to etching from a bottom surface side of the cross-sectional diagram, to thereby hollow out a central portion of the supporting substrate 205. This process can be performed using a process such as RIE (for example, Si-Deep RIE). In this case, the etching can be stopped at the oxide film 204, and only an unnecessary portion of the supporting substrate 205 can be removed. Here, the remaining portion of the supporting substrate 205 after the etching corresponds to the supporting substrate 111 illustrated in FIGS. 1A and 1B, and the cross-sectional diagram of the substrate obtained after the process is illustrated in FIG. 2B.

Figure 2C:
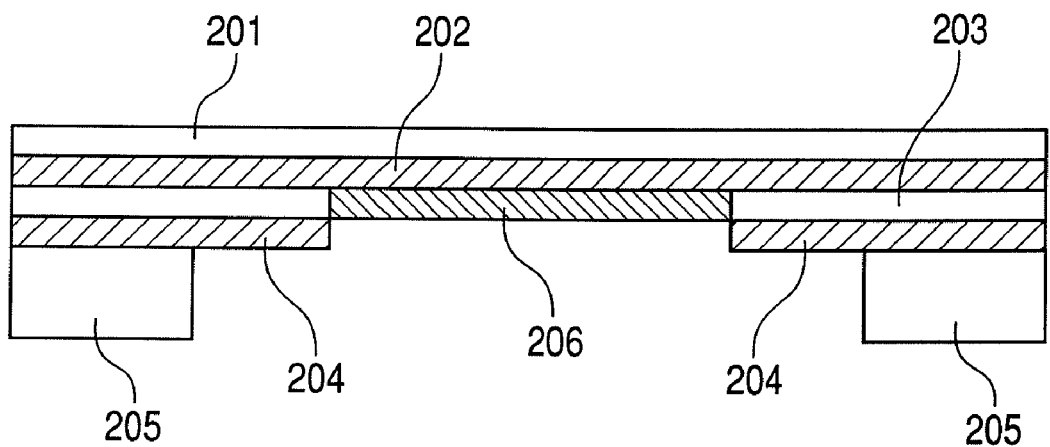

Next, an appropriate mask pattern is formed by using photolithography, and then the oxide film 204 is subjected to etching. A region to be subjected to etching corresponds to a region in which a detection electrode 206 is to be formed. The etching of this case can be performed by using buffered HF or the like. After that, the oxide film 204 remaining after etching is used as a mask, and impurities (donor or acceptor, e.g., phosphorous or boron) are implanted into the electrode forming substrate 203. As a method of introducing impurities, it is possible to employ a method of accelerating impurity ions to be implanted (ion implantation), a method of diffusing impurity ions with heat (heat diffusion) from a substrate surface (bottom surface side in this case), and the like. Thus, impurity ions are implanted into a region of the electrode forming substrate 203, at which the oxide film 204 is not formed. In a region of the electrode forming substrate 203, which has a higher concentration of impurity ions, a resistance value is reduced and a current easily flows. Accordingly, the region can be used as the detection electrode 206 (similar to detection electrode 105 illustrated in FIGS. 1A and 1B). The cross-sectional diagram of the substrate obtained after the process is illustrated in FIG. 2C. The process corresponds to a third step of forming an impurity ion implanted portion (which is also referred to as an impurity-doped portion) of an opposing member by introducing impurity ions into a second semiconductor layer using a second mask patterning. The concentration of impurities contained in the detection electrode 206 is about $1.0 \times 10^{16}$ to $1.0 \times 10^{17}/cm^3$, that is, the detection electrode 206 has a resistivity of about $1.0 \times 10^{-1}$ to $1.0 \times 10^0$ Ωcm.

Figure 2D:
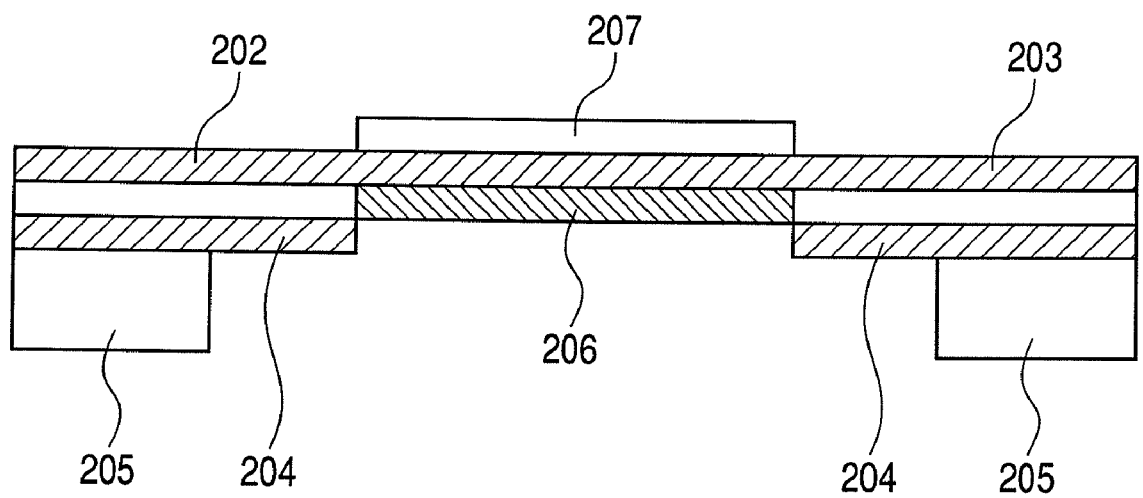

After that, an appropriate mask pattern is formed by using photolithography, and then, the movable element forming substrate 201 is subjected to etching from a top surface side of the cross-sectional diagram to hollow out peripheral portions other than the portions corresponding to the movable element 101 and the supporting beam 102 and leave the portions corresponding to the movable element 207 and the supporting beam. This process can be performed using a process such as RIE (for example, Si-Deep RIE). In this case, the etching can be stopped at the oxide film 202, and only an unnecessary portion of the movable element forming substrate 201 can be removed. Here, the remaining portions of the movable element forming substrate 201 after the etching become the portions corresponding to the movable element 101 and the supporting beam 102 illustrated in FIG. 1A. The cross-sectional diagram of the substrate obtained after the process is illustrated in FIG. 2D. The process corresponds to a second step of forming the movable element through etching of a first semiconductor layer by using a first mask patterning.

Figure 2E:
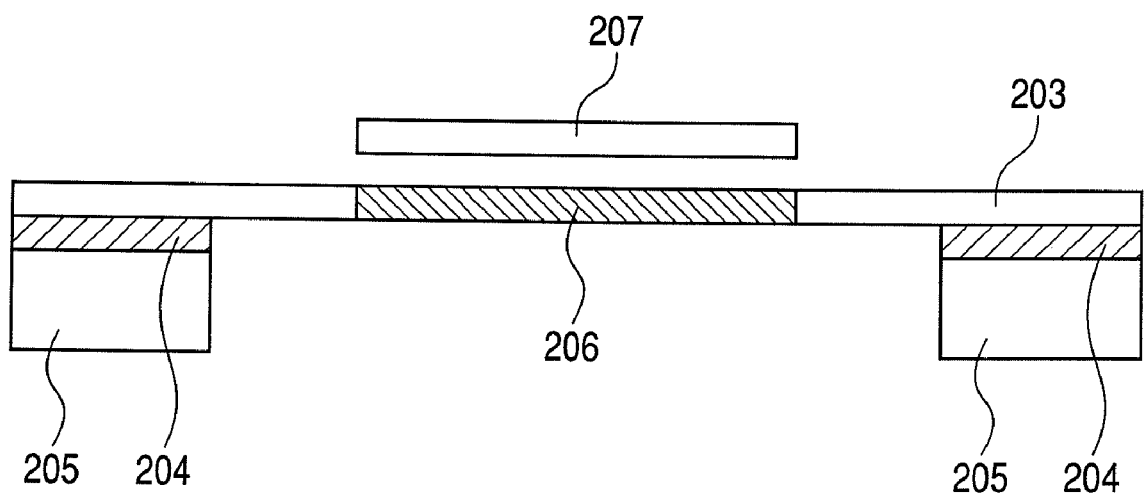

Then, the oxide film 202 is subjected to etching with only the supporting portion 104 shown in FIG. 1A being left. The etching of this case can be performed by using buffered HF or the like. As a result, the portions corresponding to the movable element 207 and the supporting beam 102 can be suspended in the air (in midair) from the electrode forming substrate 203. Note that, in this case, it is necessary to protect the oxide film 204, which is formed between the supporting substrate 205 and the electrode forming substrate 203, so as not to be etched, or it is necessary to perform patterning in consideration of the etching rate so that the oxide film 204 formed between those substrates is not completely removed. In addition, it is necessary to form a pattern so that the oxide film 202 which is in contact with the movable element 207 can be completely etched. The cross-sectional diagram of the substrate obtained after the process is illustrated in FIG. 2E. Note that, in a case of forming the electrode pad 113 on the supporting portion 104 if necessary, at the same time, a wiring (not shown) is formed on the supporting portion 104 so that the electrode pad 113, the movable element 101, and the supporting beam 102 are electrically connected to one another. The process corresponds to a fourth step of forming a spacing between the movable element and the opposing member through etching of the insulating layer sandwiched between the first semiconductor layer and the second semiconductor layer.

After that, the electrode pad 115 for leading out the wiring, and the wiring 116 (see FIG. 1A) are formed on a back surface side of the detection electrode 206, which is not opposed to the movable element 207. The process corresponds to a fifth step of forming the electrical wiring on at least a part of the impurity ion implanted portion (which is also referred to as the impurity-doped portion) formed on an opposite surface opposite to a surface which is opposed to the movable element as described above. Thus, the sensor for detecting the spacing between the movable element 207 and the detection electrode 206 can be produced.

A modified example of the sensor illustrated in FIG. 1D can also be produced according to the above-mentioned manufacturing method. In other words, in this case, as a substrate in an initial state, there may be used a substrate having the oxide film 204 and the electrode forming semiconductor substrate 203 which are formed on the movable element forming and supporting semiconductor substrate 205 in the stated order.

By employment of the above-mentioned manufacturing method, the sensor having the structure described in the first embodiment can be produced at a time by a semiconductor process, thereby enabling mass production of the sensor. The arrangement precision can be determined depending on the alignment precision and the etching precision of an exposure device at the time of pattern formation, thereby enabling reduction of an error in arranging the movable element and the detection electrode as compared with the manufacturing method as assembling or the like. As a result, it is possible to produce a high-performance sensor in which lowering of the precision of the detection signal is reduced.

The thickness of the electrode forming substrate 109 used in the first embodiment is desirably 1 μm or smaller when the step of introducing impurities is taken into consideration. When the time required for the step of introducing impurities is taken into consideration, the thickness thereof is desirably as small as possible. As for the thickness of the electrode forming substrate 109, an appropriate thickness can be selected in consideration of not only the step of introducing impurities but also a necessary mechanical strength.

Note that, in the specification of the present invention, it is described that the impurity implanted portion has a boundary surface perpendicular to the substrate, but the position of the boundary surface is not limited thereto. In practice, the position of the boundary surface varies depending on the step to be used for introducing impurities and the shape of the portion to which impurities are implanted.

Second Embodiment

A sensor according to second embodiment of the present invention is different from that according to the first embodiment in that SG-FET is used for the detection of the spacing between the movable element 101 and the substrate member 103. The other structures thereof are the same as those of the first embodiment.

Figure 3A:
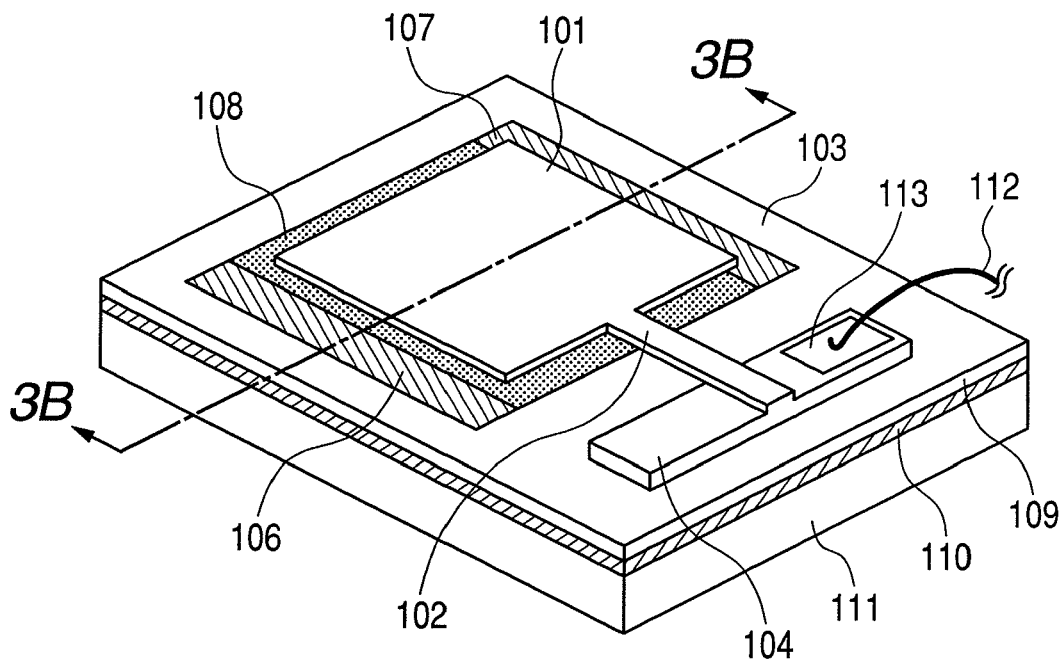
FIG. 3A is a perspective view for illustrating a sensor according to a second embodiment of the present invention.
Figure 3B:
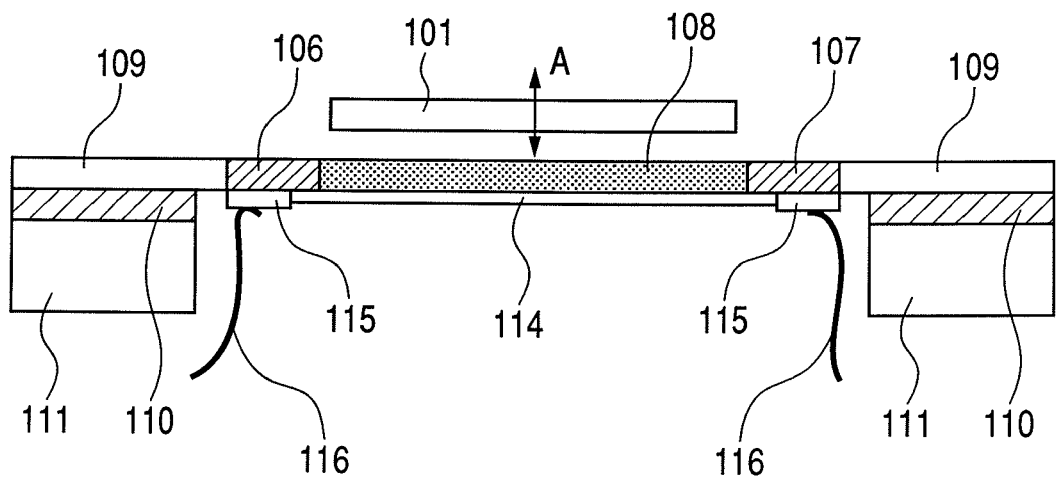
FIG. 3B is a cross-sectional diagram of the sensor according to the second embodiment.

With reference to FIGS. 3A and 3B, description is given of an acceleration sensor as an example of the sensor according to the second embodiment. FIG. 3A is a perspective view of the acceleration sensor, and FIG. 3B is a cross-sectional diagram of the acceleration sensor taken along the broken line 3B-3B of FIG. 3A. As illustrated in FIGS. 3A and 3B, the acceleration sensor includes the movable element 101, the supporting beam 102, the substrate member 103, and the supporting portion 104. Further, the acceleration sensor includes a source region 106 which is an impurity ion implanted portion, a drain region 107 which is another impurity ion implanted portion, a channel region 108 which corresponds to a portion (opposing portion) which is opposed to the movable element 101, an every-region forming substrate 109, the insulating film 110, the supporting substrate 111, the wiring 112, and the electrode pad 113. In addition, the acceleration sensor includes an insulating film 114, electrode pads 115 formed at positions corresponding to the source region 106 and the drain region 107, respectively, on the back surface which is opposite to a surface that is opposed to the movable element 101, and the wirings 116 extending from the electrode pads 115. The substrate member 103 includes the every-region forming substrate 109, the insulating film 110, and the supporting substrate 111.

In this case, a part of each of the back surfaces of the source region 106 and the drain region 107 is covered with the insulating film 114. However, at least a part of those regions reaches the opposite surface which is opposite to a surface which is opposed to the movable element 101, and the electrical wirings 116 are led out from the surfaces through the electrode pads 115. In the second embodiment, the source region 106 and the drain region 107 which are the impurity ion implanted portions, are each formed in an adjoining portion which adjoins the channel region 108 which is opposed to the movable element 101. Thus, the source region 106, the drain region 107, the channel region 108, and the movable element 101 which is suspended in the air form a field-effect transistor structure.

In the second embodiment, there is used the SG-FET in which the source region 106 and the drain region 107, each of which has the same thickness as the every-region forming substrate 109, are embedded in the every-region forming substrate 109, and the wirings 116 electrically connecting the source region 106 and the drain region 107, respectively, are led out from the surface which is not opposed to the movable element 101. Hereinafter, detailed description thereof will be given.

A desired gate voltage is applied to the movable element 101. With an electric field generated by the voltage, a channel is formed in the channel region 108 between the source region 106 and the drain region 107. By changing the magnitude of the electric field, the amount of current (drain current) that flows into the channel between the drain and the source can be changed.

In this case, when the acceleration is input to the sensor in the vertical direction of the substrate thereof, the movable element 101 is displaced upward (or downward) in the direction indicated by the arrow A. As a result, the spacing between the movable element 101 and the substrate member 103 is changed as compared with the spacing in the initial state. Due to the change of the spacing, the electric field imparted from the movable element 101 to the channel region 108 is changed. For this reason, the amount of current (drain current) that flows into the channel region 108 is changed according to the displacement of the movable element 101. The amount of the drain current is measured, thereby enabling detection of the acceleration input to the sensor.

In the SG-FET with the structure according to the second embodiment, the drain current can be extracted from the surface of the every-region forming substrate 109 on the side opposite to the side facing the movable element 101. Accordingly, it is unnecessary to form the wiring on the movable element 101 side, so the size of the movable element 101 can be increased with respect to the same substrate area, and the sensitivity of the sensor can be improved. This is because the mass of the movable element 101 is increased and the displacement of the movable element 101 is increased with respect to the same acceleration, and also because the sensitivity of the sensor is much improved as the size of the opposing area between the movable element 101 and the channel region 108 is increased also in the SG-FET structure. In addition, it is possible to obtain the effects of the first embodiment in that it is unnecessary to provide the wiring for extracting the detection signal to the portion (opposing portion) which is opposed to the movable element 101, thereby simplifying the structure on the side at which the movable element 101 is present.

Hereinafter, description is given of only differences between a method of manufacturing the sensor of the second embodiment and that of the first embodiment with reference to FIG. 4.

Figure 4:
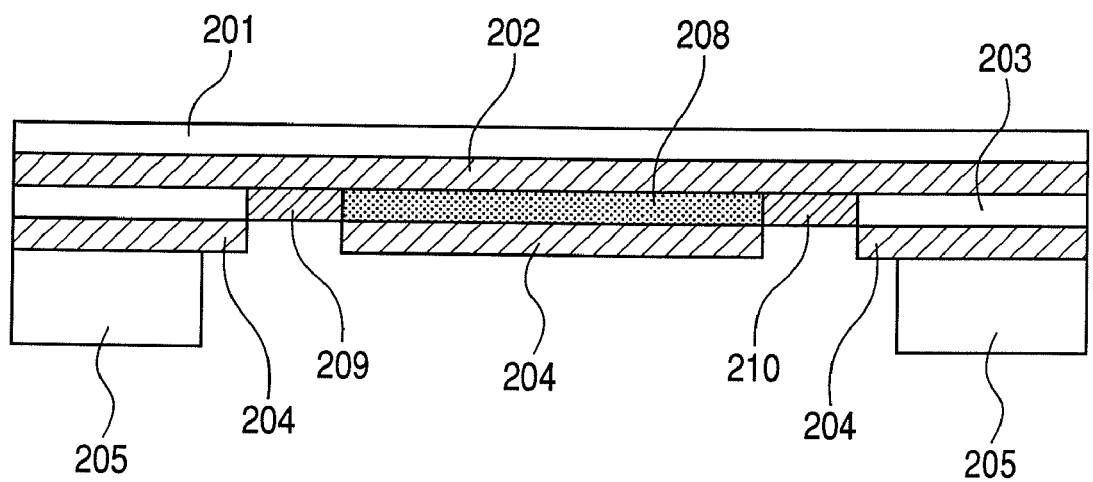
FIG. 4 is a cross-sectional diagram for illustrating a process for manufacturing the sensor according to the second embodiment of the present invention.

FIG. 4 is a cross-sectional diagram for illustrating a process for manufacturing the sensor according to the second embodiment. As illustrated in FIG. 4, the sensor includes the movable element forming substrate 201, the oxide film 202, the every-region forming substrate 203, the oxide film 204, the supporting substrate 205, a channel region 208, a source region 209, and a drain region 210.

In the manufacturing method according to the second embodiment, the manufacturing process according to the first embodiment illustrated in FIG. 2C is replaced with the process illustrated in FIG. 4. Specifically, impurity ions are not implanted into the channel region 208 which corresponds to the region of the detection electrode 206 of the first embodiment, but impurity ions are implanted into the source region 209 and the drain region 210 which are provided on both sides of the channel region 208.

Note that when the every-region forming substrate 203 is a p-type substrate, it is necessary to introduce impurity ions (boron or the like) into each region so as to form an n-type region. When the every-region forming substrate 203 is an n-type substrate, it is necessary to introduce impurity ions (phosphorus or the like) into each region so as to form a p-type region. As a result, the type of the channel region 208 and the type of each of the source region 209 and the drain region 210 are different from each other, thereby enabling formation of the SG-FET. Alternatively, impurity ions may be implanted into the channel region 208 of the every-region forming substrate 203 in advance, to thereby form the p-type region or the n-type region. In this case, this can be used in the same manner as in the case of using the p-type substrate or the n-type substrate.

When the above-mentioned manufacturing method according to the second embodiment is employed, in the SG-NET, a sensor structure for extracting the drain current from the surface of the every-region forming substrate 109, which is not opposed to the movable element 101, can be produced at a time with a simple method, thereby enabling mass production of the sensor. In addition, the other effects of the manufacturing method according to the first embodiment can be obtained.

Next, with reference to FIGS. 3C, 3D, 3E, 3F, and 3G, description is given of an acceleration sensor according to a modified example of the sensor according to the second embodiment. FIGS. 3C, 3D, 3E, 3F, and 3G are cross-sectional diagrams illustrating the modified example of the acceleration sensor of the second embodiment.

Figure 3C:
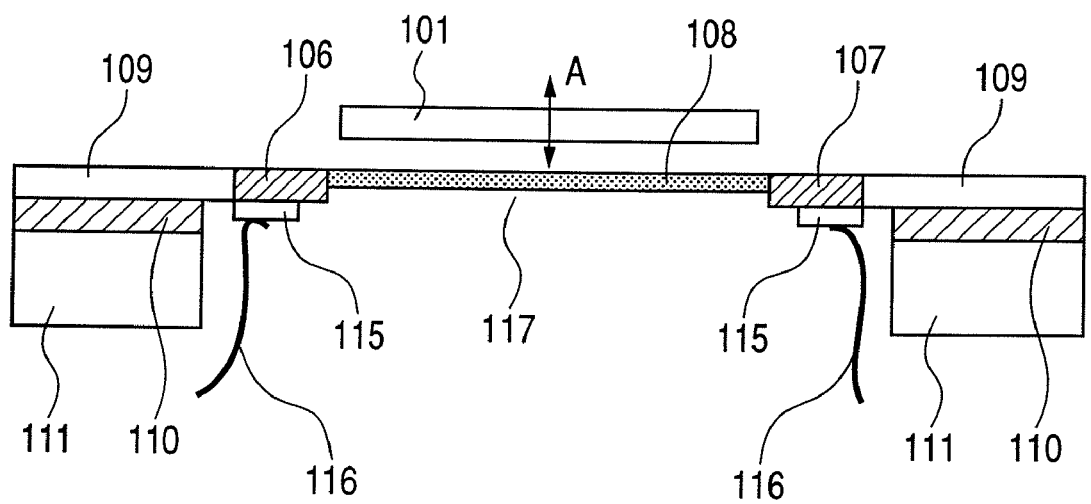
FIGS. 3C, 3D, 3E, 3F and 3G are cross-sectional diagrams each illustrating a modified example of the sensor according to the second embodiment of the present invention.

In the example of FIG. 3C, the thickness of the channel region 108 is smaller than that of the every-region forming substrate 109. Specifically, the channel region 108 has a depressed portion 117 on the side of the every-region forming substrate 109, which is not opposed to the movable element 101. Even in a case where the wirings 116 are led out from the back surface by using the every-region forming substrate 109 with a large thickness so as to have a necessary mechanical strength, when the structure is employed, a sensor with a small leak current, low noise, and with high sensitivity can be provided. The structure can be produced when the following step is added to the manufacturing process. That is, a step (1) of etching the surface corresponding to the channel region 108 and introducing impurity ions thereinto, or a step (2) of introducing impurity ions into the channel region 108, and then etching the surface thereof.

Figure 3D:
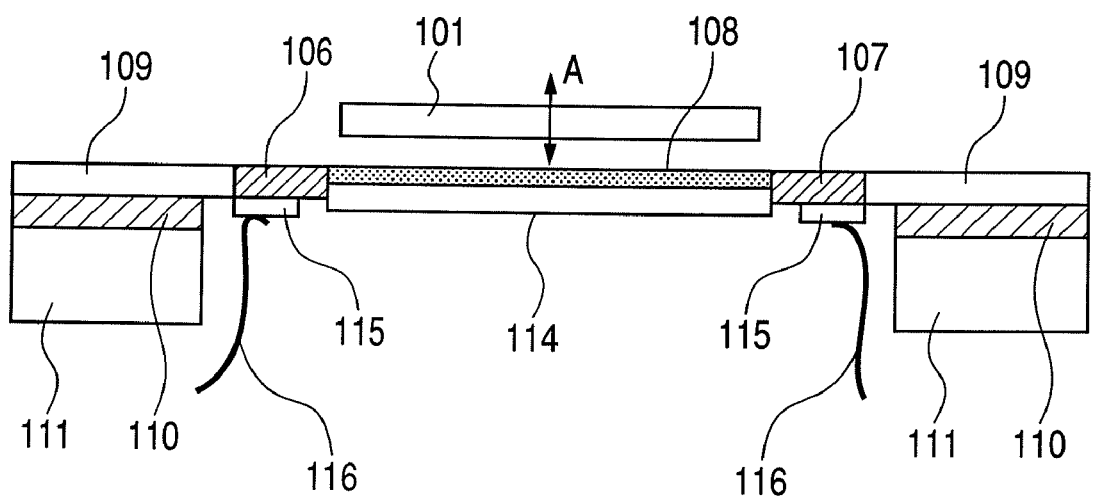

The example illustrated in FIG. 3D is characterized by the oxide film 114 being formed in the substrate 109 on the side of the every-region forming substrate 109, which is not opposed to the movable element 101. Accordingly, a sensor with a small leak current, low noise, and with high sensitivity can be provided while securing the mechanical strength in the channel region 108 of the every-region forming substrate 109. The channel region 108 on the surface of the every-region forming substrate 109, which is not opposed to the movable element 101, is subjected to thermal oxidation, with the result that the structure of the oxide film 114 can be easily achieved. In this case, the oxide film 114 can be used as a mask to be used in the case of introducing impurity ions into the source region 209 and the drain region 210. The insulating film 114 illustrated in FIG. 3B has a function similar to the oxide film 114.

Figure 3E:
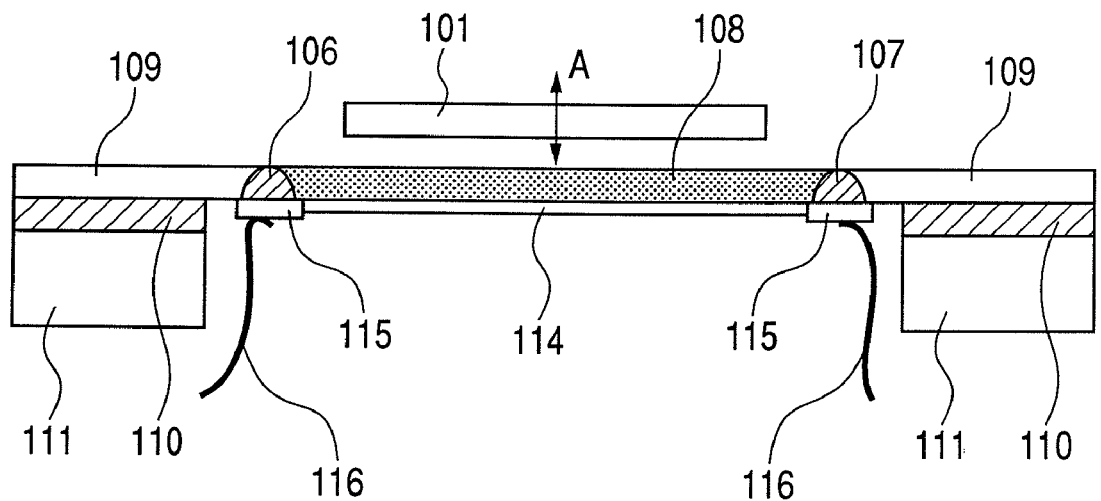

The example illustrated in FIG. 3E is characterized by the source and drain regions, in the cross-section of the every-region forming substrate 109 in the horizontal direction, each becoming narrower toward the surface of the every-region forming substrate 109, which is opposed to the movable element 101. In the case of producing the structure, introduction of impurity ions into the source region 106 and the drain region 107 can be performed with a more simple process. Consideration is given to a case where impurity ions are implanted from the surface of the every-region forming substrate 109, which is not opposed to the movable element 101, by, for example, thermal diffusion with reference to FIG. 4. The impurity ions are isotropically diffused. Accordingly, when an opening of the mask of the oxide film 204 is reduced in size about twice as large as the thickness of the every-region forming substrate 109, thereby enabling formation of the source region 106 and the drain region 107 in a short period of time. The process corresponds to a process of forming the source region and the drain region, which are impurity ion implanted portions, by performing thermal diffusion from the surface of the opposing member, which is opposite to a surface that is opposed to the movable element, to introduce impurity ions thereinto, in the above-mentioned third step. At this time, the source region 106 and the drain region 107 are formed so as to pass through the substrate 109 and be in contact with the both surfaces of the substrate 109. In this manner, the source region 106 and the drain region 107 are formed with small areas, respectively, on the surface of the every-region forming substrate 109, which is opposed to the movable element 101, thereby performing operations as the SG-FET. The concentration of impurities contained in each of the source region 209 and the drain region 210 is about $1.0 \times 10^{16}$ to $1.0 \times 10^{21}/cm^3$, that is, about $1.0 \times 10^0$ to $1.0 \times 10^{-4}$ $\Omega cm$ in terms of resistivity.

Figure 3F:
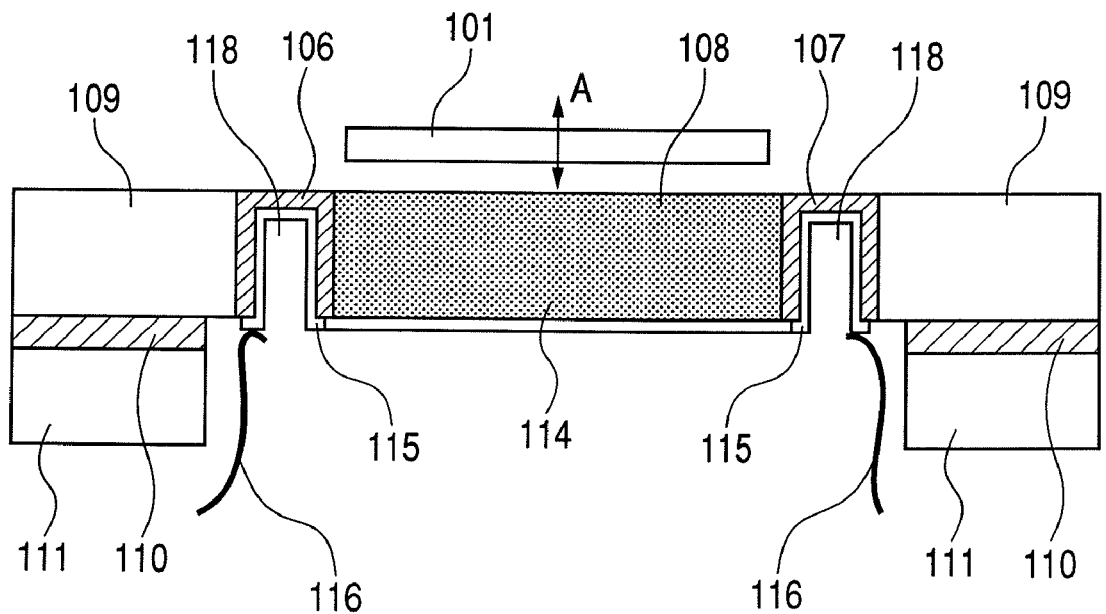

The example illustrated in FIG. 3F is characterized by the source region 106 and the drain region 107 which are formed on the side of the every-region forming substrate 109, which is not opposed to the movable element 101, each being provided with a groove 118. FIG. 3F illustrates an example in which the electrode pad 115 is formed at a portion of the groove 118. Even in the case of using the every-region forming substrate 109 having a relatively large thickness in the structure, it is possible to facilitate production of the SG-FET in which the wiring is led out from the back surface which is not opposed to the movable element 101. With this structure, it is sufficient to introduce impurity ions with a thickness corresponding to the distance obtained by subtracting the depth of the groove 118 from the thickness of the substrate 109. For this reason, when the distance is set within a range of the depth (as described above, desirably 1 μm or smaller) in which the impurity ions can be implanted into the substrate 109, the thickness of the every-region forming substrate 109 can be arbitrarily set (for example, can be set to several hundreds μm). Thus, also in this case, the source region 106 and the drain region 107 are formed so as to pass through the substrate 109 and reach both surfaces of the substrate 109. The example of FIG. 3F illustrates a case where the thermal diffusion is performed from the every-region forming substrate 109 side which is not opposed to the movable element 101 to introduce impurity ions thereinto. The source region 106 and the drain region 107 each have a U-shaped cross-sectional shape. This process corresponds to a process, in the third step, of performing etching from the surface of the opposing member, which is opposite to a surface that is opposed to the movable element, to form a depressed portion, and then introducing impurity ions into the portion in which the depressed portion is formed, to thereby form the source region and the drain region which are impurity ion implanted portions.

Further, in this structure, the thickness of the every-region forming substrate 109 is increased and the wiring can be led out from the back surface. As a result, the supporting substrate 111 is not necessarily provided. In this case, a spacer is provided in a package for the entire sensor, for example, so as to deal with interference between the wiring 116 and another member, thereby enabling reduction in number of components of the sensor itself and number of processes.

Further, the insulating film or the like is formed in the portions corresponding to the groove 118, thereby also enabling reinforcement of the mechanical strength of the every-region forming substrate 109. In this case, when the electrode pads 115 are formed on a part of the impurity ion implanted regions 106 and 107, the wirings 116 can be led out.

Figure 3G:
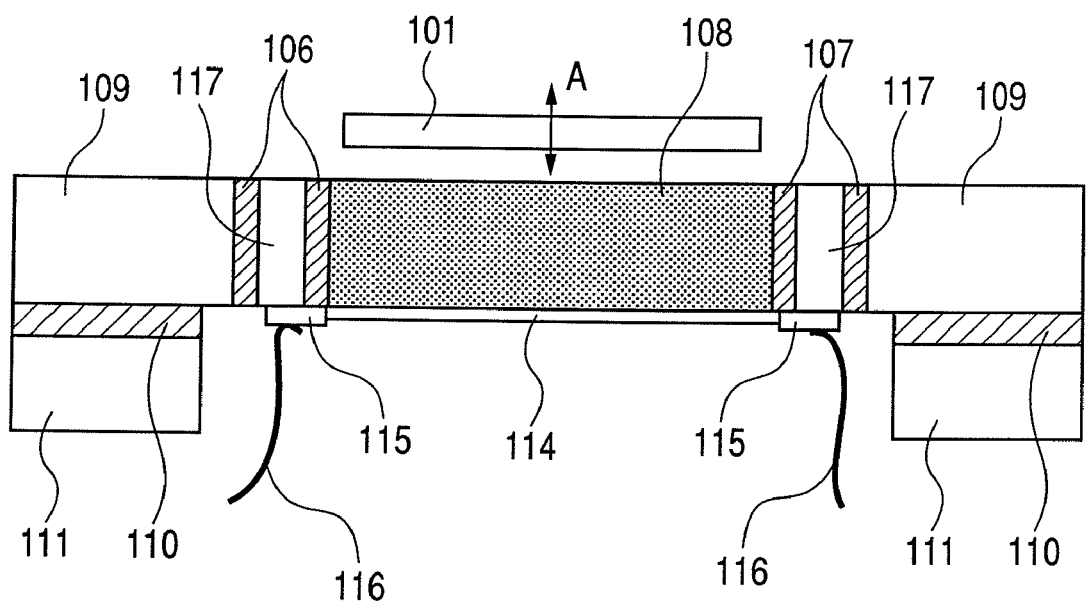

The example illustrated in FIG. 3G is characterized by the groove of FIG. 3F passing through the every-region forming substrate 109 and the insulating film 117 is formed in a through hole portion. With this structure, in the case of using the every-region forming substrate 109 with a large thickness, the manufacturing process can be simplified as compared with that illustrated in FIG. 3F. The process of stopping the etching of the substrate halfway through the process to form the groove is not employed, thereby simplifying the process as the process of passing through the substrate. In addition, heat diffusion can be performed from a surface of the every-region forming substrate 109, which is not opposed to the movable element 101, or from a surface thereof, which is opposed to the movable element 101, thereby to introduce impurity ions.

Third Embodiment

A sensor according to a third embodiment of the present invention is different from that according to the second embodiment in that the movable element has through holes. The other structures thereof are the same as those of the second embodiment. The sensor according to the third embodiment is characterized by the movable element 101 having through holes 117, and the source region 106 and the drain region 107 being formed in portions of the substrate member 103, which are opposed to the through holes 117.

Figure 5A:
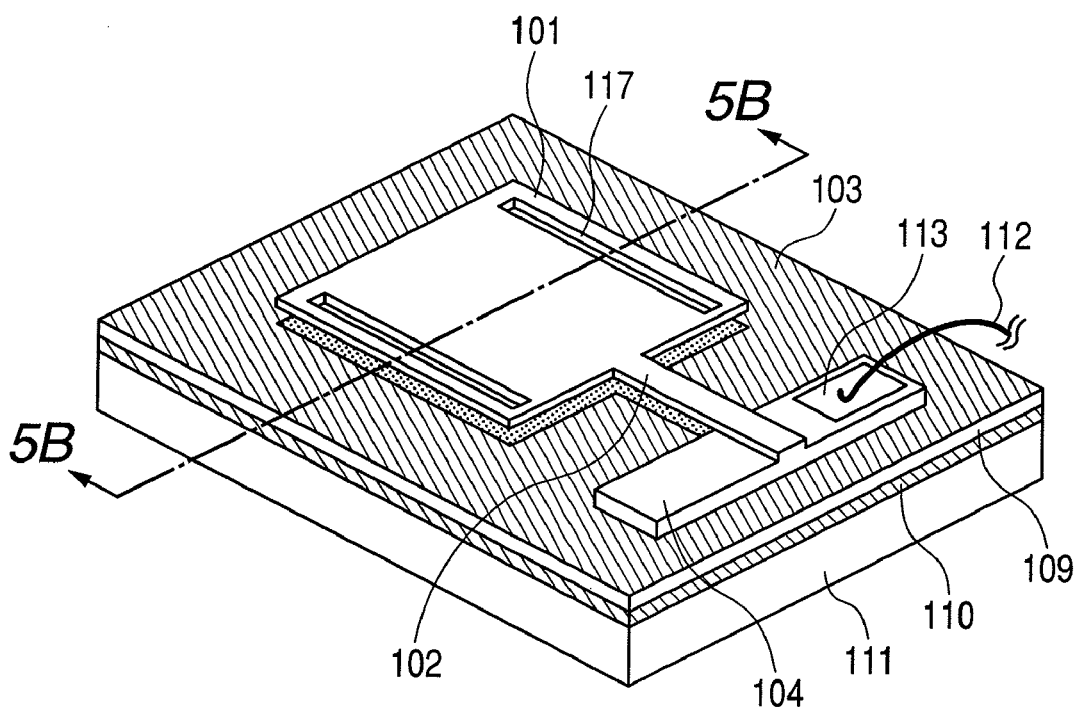
FIG. 5A is a perspective view for illustrating a sensor according to a third embodiment of the present invention.
Figure 5B:
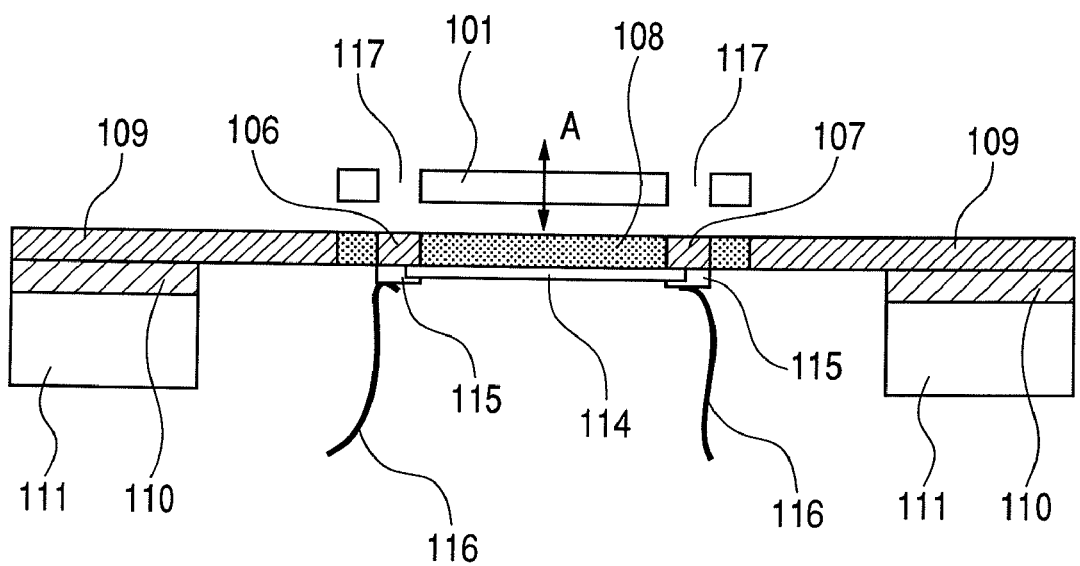
FIG. 5B is a cross-sectional diagram of the sensor according to the third embodiment.

With reference to FIGS. 5A and 5B, description is given of an acceleration sensor as an example of the sensor according to the third embodiment. FIG. 5A is a perspective view of the acceleration sensor, and FIG. 5B is a cross-sectional diagram of the acceleration sensor taken along the broken line 5B-5B of FIG. 5A. As illustrated in FIGS. 5A and 5B, the acceleration sensor includes the movable element 101, the supporting beam 102, the substrate member 103, the supporting portion 104, the source region 106, the drain region 107, the channel region 108, the every-region forming substrate 109, the insulating film 110, the supporting substrate 111, the wiring 112, the electrode pad 113, the electrode pads 115 formed at positions corresponding to the source region 106 and the drain region 107, respectively, on the back surface which is opposite to the surface opposed to the movable element 101, and the wirings 116 extending from the electrode pads 115. In addition, the through holes 117 are formed in the movable element 101. The substrate member 103 includes the every-region forming substrate 109, the insulating film 110, and the supporting substrate 111.

The movable element 101 has the through holes 117, and regions corresponding to the through holes 117 substantially match with the regions corresponding to the source region 106 and the drain region 107, respectively, when viewed from the top surface of the substrate member 103. Between the source region 106 and the drain region 107, the channel region 108 is formed. Further, impurity ions are also implanted into the movable element 101 and the supporting beam 102. In addition, when viewed from the top surface of the substrate member 103, impurity ions are also implanted into the portion of the substrate member 103, which is not covered with the movable element 101, the supporting beam 102, and the supporting portion 104.

In the third embodiment, the width of the channel region 108 does not match with the width of the movable element 101. However, there arises no problem in detecting the displacement of the movable element 101, so the drain current can be changed due to the displacement of the movable element 101. Further, if the other regions in which impurities are implanted are appropriately biased, the detection of the displacement of the movable element 101 is not affected.

By the use of this sensor structure, the manufacturing process can be simplified to a large extent. The manufacturing process is described below.

FIGS. 6A to 6E are cross-sectional diagram each illustrating the process of manufacturing the acceleration sensor according to the third embodiment. As illustrated in FIGS. 6A to 6E, the acceleration sensor includes the movable element forming substrate 201, the oxide film 202, the every-region forming substrate 203, the oxide film 204, the supporting substrate 205, the movable element 207, the channel region 208, the source region 209, and the drain region 210.

Figure 6A:
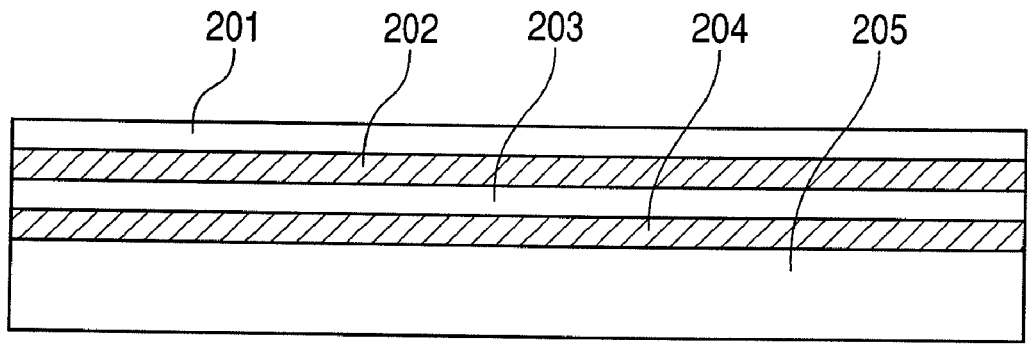
FIGS. 6A, 6B, 6C, 6D and 6E are cross-sectional diagrams for illustrating a method of producing the sensor according to the third embodiment of the present invention of the present invention.
Figure 6B:
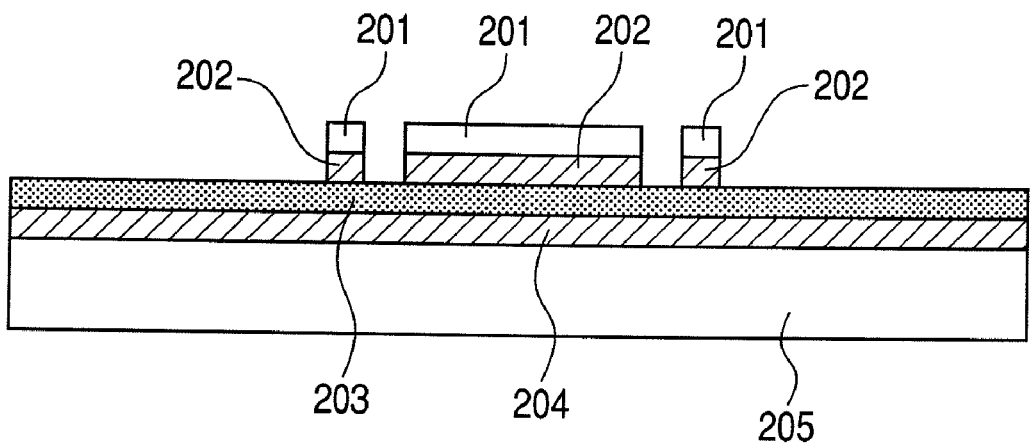

FIG. 6A illustrates a substrate in an initial state. First, the movable element forming substrate 201 is subjected to etching from the top surface side of the cross-sectional diagram, to thereby hollow out portions corresponding to the peripheral portions of the movable element 101 and the supporting beam 102, and leave the portions corresponding to the movable element 207, the supporting beam 102, and the supporting portion 104. Then, the remaining portion of the movable element forming substrate 201 is used as a mask, and the oxide film 202 is subjected to etching. In this case, the remaining portions of the movable element forming substrate 201 after the etching become the movable element 101, the supporting beam 102, and the supporting portion 104 as illustrated in FIG. 5A. FIG. 6B illustrates the cross-sectional diagram of substrate obtained after the process.

After that, the oxide film 202 which remains under the portion of the movable element forming substrate 201 remaining after the etching is used as a mask, and impurity ions (phosphorus, boron, or the like) are implanted into the every-region forming substrate 203. As a result, the source region 209 and the drain region 210 can be formed.

Figure 6C:
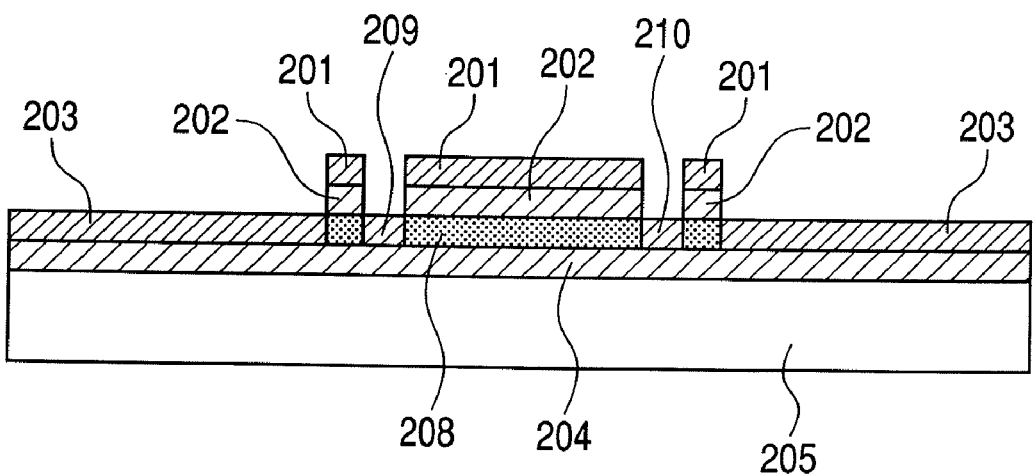

Note that the impurity ions are also implanted into the entire surface of the remaining portion of the movable element forming substrate 201, and into the regions of the every-region forming substrate 203 in which the movable element 101, the supporting beam 102, and the supporting portion 104 (see FIG. 5A) are not formed. As a result of introducing the impurities, an effect of improving an electrical conductivity of each of the movable element 101 and the supporting beam 102 can be expected. FIG. 6C is a cross-sectional diagram of the substrate obtained after this process. This process corresponds to a process, in the third step, of introducing impurity ions into the second semiconductor layer with a pattern of the through holes viewed from the top surface of the substrate being used as a mask, to form the source region and the drain region which are the impurity ion implanted portions.

Figure 6D:
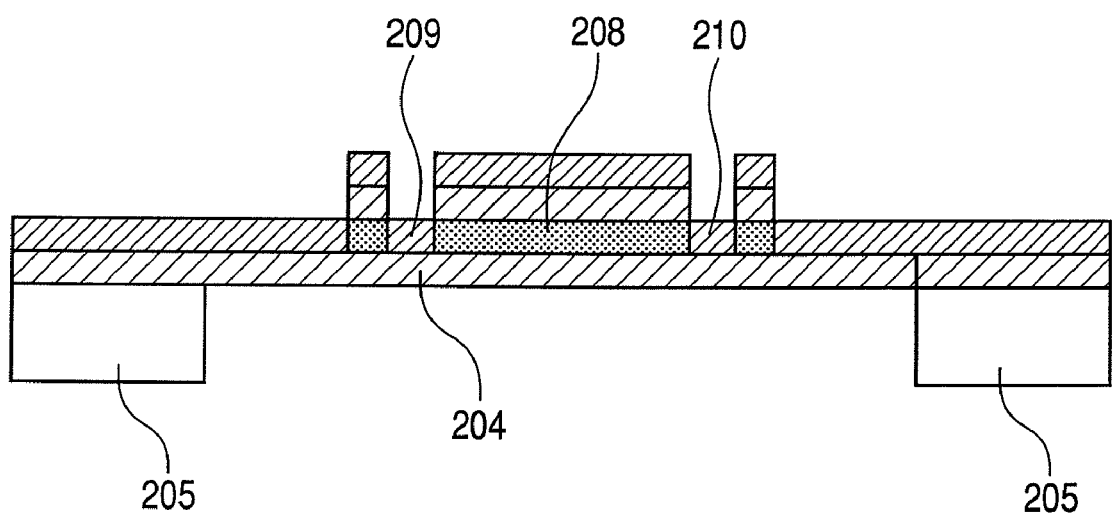

Then, the supporting substrate 205 is subjected to etching from the bottom surface side of the cross-sectional diagram to hollow out the central portion of the supporting substrate 205. In this case, the remaining portion of the supporting substrate 205 after the etching becomes the supporting substrate 111 of FIG. 5A. FIG. 6D is a cross-sectional diagram of the substrate obtained after the process.

Figure 6E:
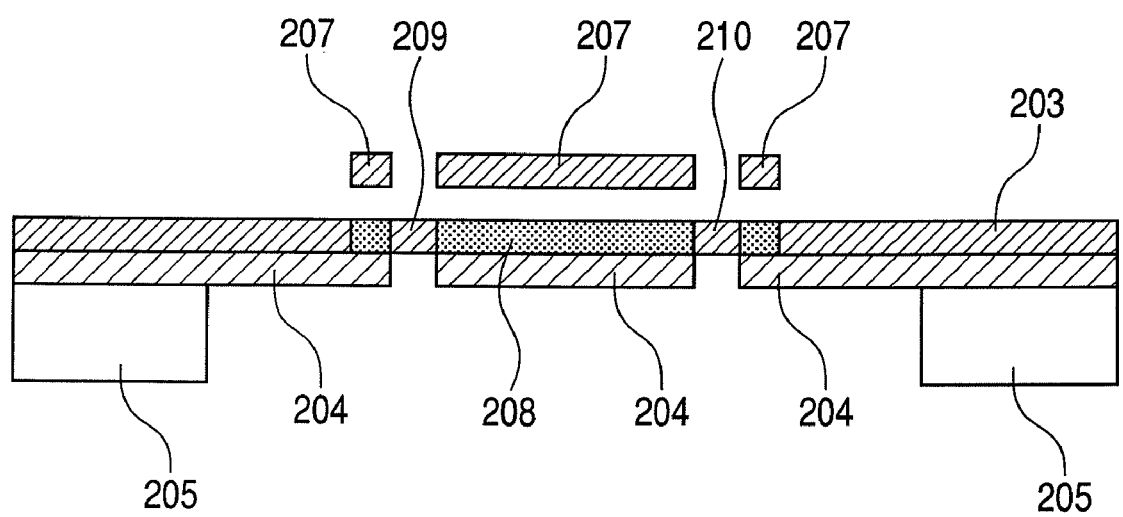

Then, the oxide film 202 is subjected to etching with only the supporting portion 104 of FIG. 5A being left. As a result, it is possible to obtain the structure in which the movable element 101 and the supporting beam 102 are suspended in the air (in midair). At the same time, the oxide film 204 may be subjected to etching for providing contact between the source region 209 and the drain region 210. FIG. 6E is a cross-sectional diagram of the substrate obtained after the process.

After that, the electrode pads for leading out the wirings, and the wirings are formed, thereby enabling production of the sensor for detecting the spacing between the movable element 207 and the channel region 208.

By employment of the method of manufacturing the sensor according to the third embodiment, the simple structure for leading out the wiring from the back surface in which the movable element 207 is not formed can be achieved at a time with a more simple manufacturing method. Accordingly, the sensor using a FET structure with higher performance can be provided with high reliability.

Fourth Embodiment

Next, description is given of a sensor according to a fourth embodiment of the present invention. In the fourth embodiment, there is illustrated an example where the sensor according to the present invention is applied to a gyroscope sensor with the SG-FET structure. The other structures of the sensor according to the fourth embodiment are the same as those of the sensor according to the second or third embodiment. In the gyroscope sensor, the movable element forms a detection oscillator, the opposing member forms a part of a reference oscillator, the detection oscillator is oscillatably supported with respect to the reference oscillator, and the reference oscillator is oscillatably supported with respect to the supporting substrate. In addition, the displacement of the detection oscillator which receives a Coriolis force due to an oscillation of the reference oscillator and an input of an angular velocity is detected based on a change in a relative positional relationship between the detection oscillator and the reference oscillator.

Figure 7A:
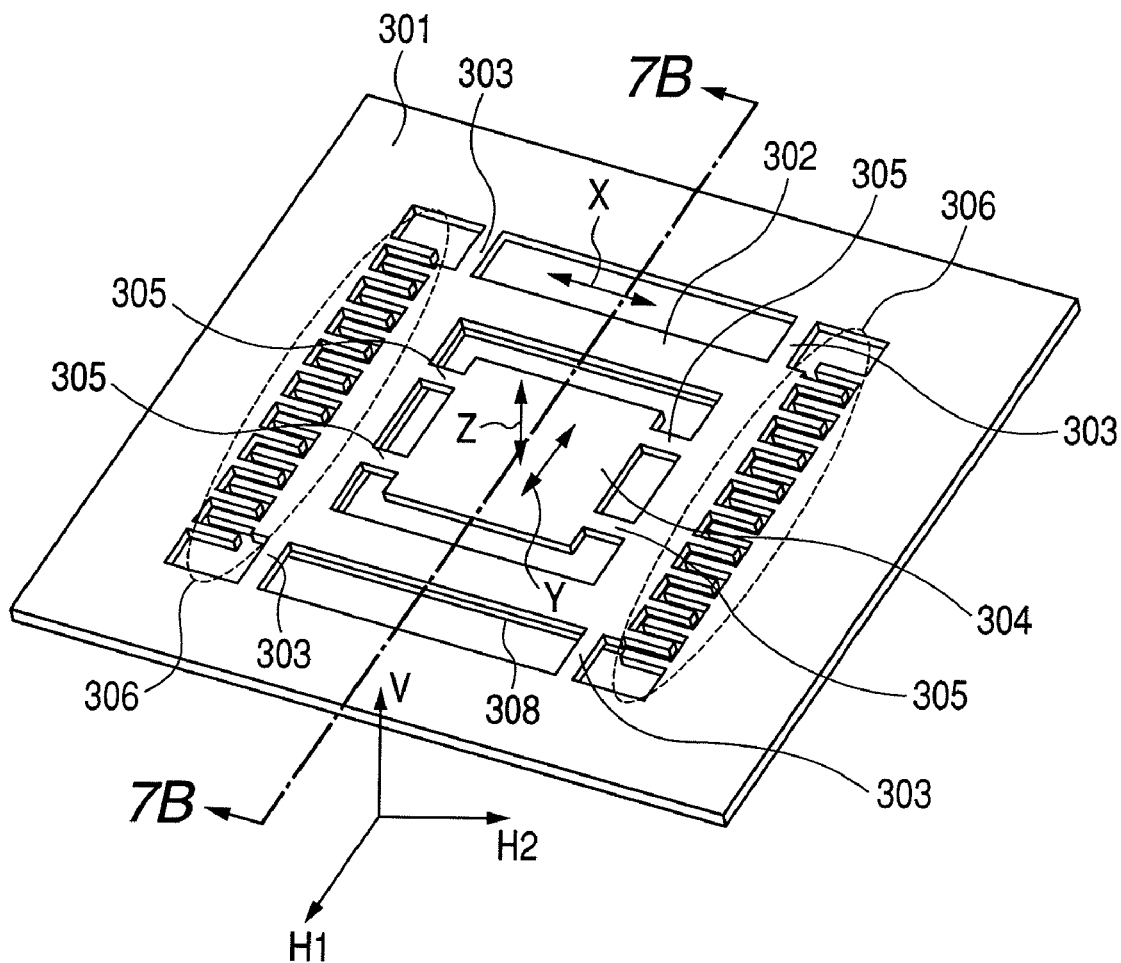
FIG. 7A is a perspective view for illustrating a sensor according to a fourth embodiment of the present invention.
Figure 7B:
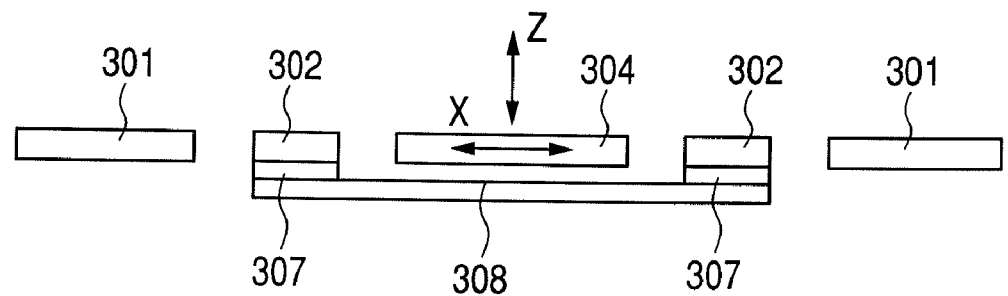
FIG. 7B is a cross-sectional diagram of the sensor according to the fourth embodiment.

In this manner, the gyroscope sensor causes a certain movable element to constantly oscillate, and utilizes the Coriolis force acting on the movable element through the input of the angular velocity from an external portion. The sensor detects an oscillation of the movable element in another direction generated due to the Coriolis force, to thereby detect the angular velocity. The gyroscope sensor according to the fourth embodiment has a structure including a movable element caused to constantly oscillate, and another movable element used for detection. With reference to FIGS. 7A and 7B, description is given of the gyroscope sensor according to the fourth embodiment.

FIG. 7A is a perspective view of the gyroscope sensor, and FIG. 7B is a cross-sectional diagram of the gyroscope sensor taken along the broken line 7B of FIG. 7A. As illustrated in FIGS. 7A and 7B, the gyroscope sensor includes a supporting substrate 301, reference movable elements 302 and 308, a supporting member 303 for movably supporting the reference movable elements 302 and 308, a detection movable element 304, a supporting member 305 for movably supporting the detection movable element 304, drive units (reference-oscillation-generating unit) 306 for driving the reference movable elements 302 and 308, and a spacer 307.

The reference movable element 302 is integrated with the reference movable element 308 via the spacer 307. Hereinafter, an integrated form of the reference movable element 302, the spacer 307, and the reference movable element 308 is referred to as "reference movable element R".

The reference movable element R is supported by the supporting member 303 connected to the supporting substrate 301. The detection movable element 304 is supported by the supporting member 305 connected to the reference movable element R. The reference movable element R has a spring structure which is liable to oscillate in a direction indicated by the arrow X. On the other hand, the detection movable element 304 has a spring structure which is liable to oscillate in directions indicated by the arrows Y and Z. As illustrated in FIG. 7A, the directions indicated by X, Y, and Z are perpendicular to each other.

At the time of operation, the reference movable element R is constantly oscillating in the X-direction by the reference-oscillation-generating unit 306 having an electrostatic comb-shaped structure. The detection movable element 304 has a spring structure which hardly oscillates in the X-direction, so the detection movable element 304 oscillates with the same oscillation amplitude synchronized with the oscillation of the reference movable element R. In this case, when the angular velocity about one of an axis V and an axis H1, which are perpendicular to each other as in the directions of X, Y, and Z, is input, a Coriolis force is generated in the Y-direction or in the Z-direction, and the detection movable element 304 oscillates in the directions of the arrow Y or the arrow Z.

The gyroscope sensor according to the fourth embodiment includes a unit for detecting a relative positional relationship between the reference movable element R and the detection movable element 304 (hereinafter, referred to as oscillation-detecting unit; see FIG. 8, described below). By the use of the oscillation-detecting unit, the oscillation of the detection movable element 304 in the directions of the arrow Y or the arrow Z due to the Coriolis force is detected. The magnitude of the oscillation corresponds to the magnitude of the Coriolis force. Accordingly, the magnitude of the oscillation is detected, thereby enabling detection of the magnitude of the angular velocity. The method of detecting the relative position between the reference movable element R and the detection movable element 304 is employed, so even when the reference oscillation of the reference movable element R has components in directions other than a predetermined oscillation direction (indicated by arrow X), noise caused due to the reference oscillation is unlikely to be superimposed on the detection signal, and a signal with high stability can be detected.

By the employment of the structure according to the fourth embodiment, it is possible to provide the gyroscope sensor for detecting the angular velocity about multiple axes H1 and V.

The oscillation-detecting unit according to the fourth embodiment is described below.

Figure 8:
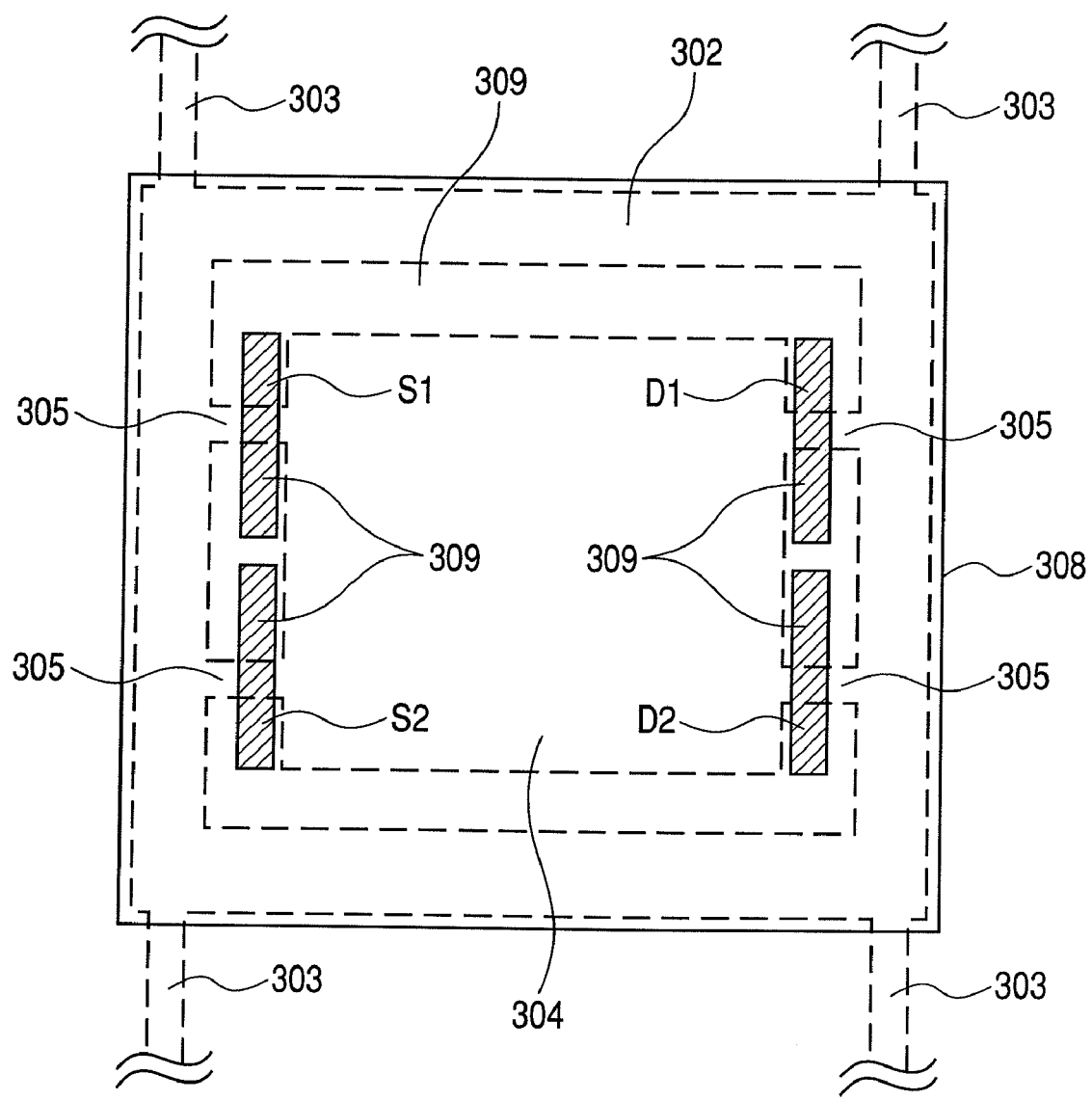
FIG. 8 is a top view for illustrating the sensor according to the fourth embodiment of the present invention.

FIG. 8 is a diagram viewed from the top surface of the reference movable element 308. The portion indicated by the solid lines corresponds to the reference movable element 308. The portions indicated by the broken lines each correspond to the reference movable element 302 connected to the reference movable element 308 through the spacer 307, the detection movable element 304, the supporting member 303, and the supporting member 305. Note that the comb-shaped structure of the reference-oscillation-generating unit 306 is omitted in FIG. 8. In FIG. 8, an impurity ion implanted region 309 reaches both the front and back surfaces of the reference movable element 308 and is formed in the reference movable element 308. Wirings for the impurity ion implanted region 309 are formed in the same manner as in the case of the source region and the drain region according to the second embodiment.

The impurity ion implanted region 309 is characterized by having four regions formed along a contour shape of the detection movable element 304 as illustrated in FIG. 8. As a result, it is possible to detect the oscillation of the detection movable element 304 which oscillates in the directions of the arrow Z (perpendicularly with respect to the face of FIG. 8) and the arrow Y (vertical direction in the face of FIG. 8). Here, two impurity ion implanted regions 309 on the left side in the space of FIG. 8 are referred to as source regions (S1 and S2), and the other two impurity ion implanted regions 309 on the right side of the space of FIG. 8 are referred to as drain regions (D1 and D2). Between each of the source regions (S1 and S2) and each of the drain regions (D1 and D2), a predetermined voltage is applied. A predetermined potential is also provided to the detection movable element 304, and the magnitude of the electric field in the source regions and the drain regions is changed due to the oscillation of the detection movable element 304 (however, a region in which the magnitude of the electric field is not changed is present in some cases). As a result, a current flowing between each of the drain regions (D1 and D2) and each of the source regions (S1 and S2) is changed (the current is not changed in some cases). The value of the current is measured to detect the oscillations of the detection movable element 304 in the directions of the arrow Z and the arrow Y.

When the detection movable element 304 oscillates in the direction of the arrow Z, the change in amount of the current flowing between the source drain region D1 and the source region S1, and the change in amount of the current flowing between the drain region D2 and the source region 2 are increased or decreased in the same direction. This is because the detection movable element 304 oscillates in the vertical direction with respect to the reference movable element 308. As a result, the changes of the electric field in upper and lower channel regions (channel region between drain region D1 and source region S1, and channel region between drain region D2 and source region S2) of FIG. 8 show the same tendency.

On the other hand, when the detection movable element 304 oscillates in the direction of the arrow Y, one of the amount of the current flowing between the drain region D1 and the source region S1, and the amount of the current flowing between the drain region D2 and the source region S2, hardly changes, and the other of the amounts is increased or decreased. This is because the following state is obtained when the moment at which the detection movable element 304 is moved in the direction of the space of FIG. 8 is taken into consideration. The electric field applied between the drain region D1 and the source region S2 hardly changes, so the current flowing therebetween hardly changes. However, the electric field applied between the drain region D2 and the source region S2 is decreased by the amount by which the detection movable element 304 is shifted upward, so the current flowing therebetween is increased (decreased) correspondingly. The current is increased or decreased depending on the combination of conductivity types of the respective regions. The same principle is applied to a case where the detection movable element 304 is moved downward of the space of FIG. 8.

The structure illustrated in FIG. 8 can be easily produced by employment of the manufacturing process described in the second embodiment. However, it is necessary to perform an Si etching process as well as the manufacturing process according to the second embodiment.

As described above, according to the fourth embodiment, the SG-FET gyroscope sensor capable of detecting the angular velocity about each of two axes can be achieved. The SG-FET is used to detect the angular velocity, so a sensor with high sensitivity and high performance can be achieved.

Further, also in the fourth embodiment, there is employed the structure in which the wirings are led out from the back surface side at which the detection movable element 304 is not present. Accordingly, the structure on the side at which the detection movable element 304 is present is simplified, and the structure can be easily produced. As a result, the shape of each of the detection movable element 304 and the reference movable element 302 can be set as an appropriate shape in view of the sensor performance without imposing limitation on leading-out of the wirings from the drain region and the source region.

The gyroscope sensor according to the fourth embodiment has higher detection sensitivity as the size of the detection movable element 304 is increased. Further, the detection sensitivity of the sensor is enhanced as the magnitude of the reference oscillation of the reference movable element R is increased, so it is desirable that the size of the entire sensor be reduced because the oscillation thereof can be increased. In view of the above, in order to achieve the gyroscope sensor with high sensitivity, it is desirable that the detection movable element be made as large as possible, whereas the reference movable element have a minimum size capable of holding the necessary mechanical strength. Thus, according to the fourth embodiment capable of leading out the wirings from the back surface with a simple structure, it is possible to achieve a gyroscope sensor capable of easily performing the desirable settings and having high sensitivity.

Fifth Embodiment

A sensor according to a fifth embodiment of the present invention is different from that according to the fourth embodiment in arrangement of impurity ion implanted regions. The other structures thereof are the same as those of the fourth embodiment. Accordingly, reference numerals which denote the directions of oscillations and the like are described with reference to FIGS. 7A and 7B according to the fourth embodiment. In the fifth embodiment, based on the same idea as the third embodiment capable of simplifying the manufacturing process to a large extent, through holes are formed in the detection movable element 304, and the impurity ion implanted regions 309 are provided as illustrated in FIG. 9.

The sensor according to the fifth embodiment is described with reference to FIG. 9. Specifically, the sensor according to the fifth embodiment is characterized by the detection movable element 304 having four through holes 310, 311, 312, and 313 formed therein, and the positions of the through holes substantially matching with the positions of the impurity ion implanted regions 309, respectively, when viewed from the vertical direction of the face of FIG. 9. In other words, the regions in which the impurity ion implanted regions 309 are to be formed substantially match with the regions in which the reference movable element 302, the detection movable element 304, and the supporting member 305 are not formed. With the structure as described above, in the same manner as in the third embodiment, the manufacturing process can be simplified to a large extent.

Figure 9:
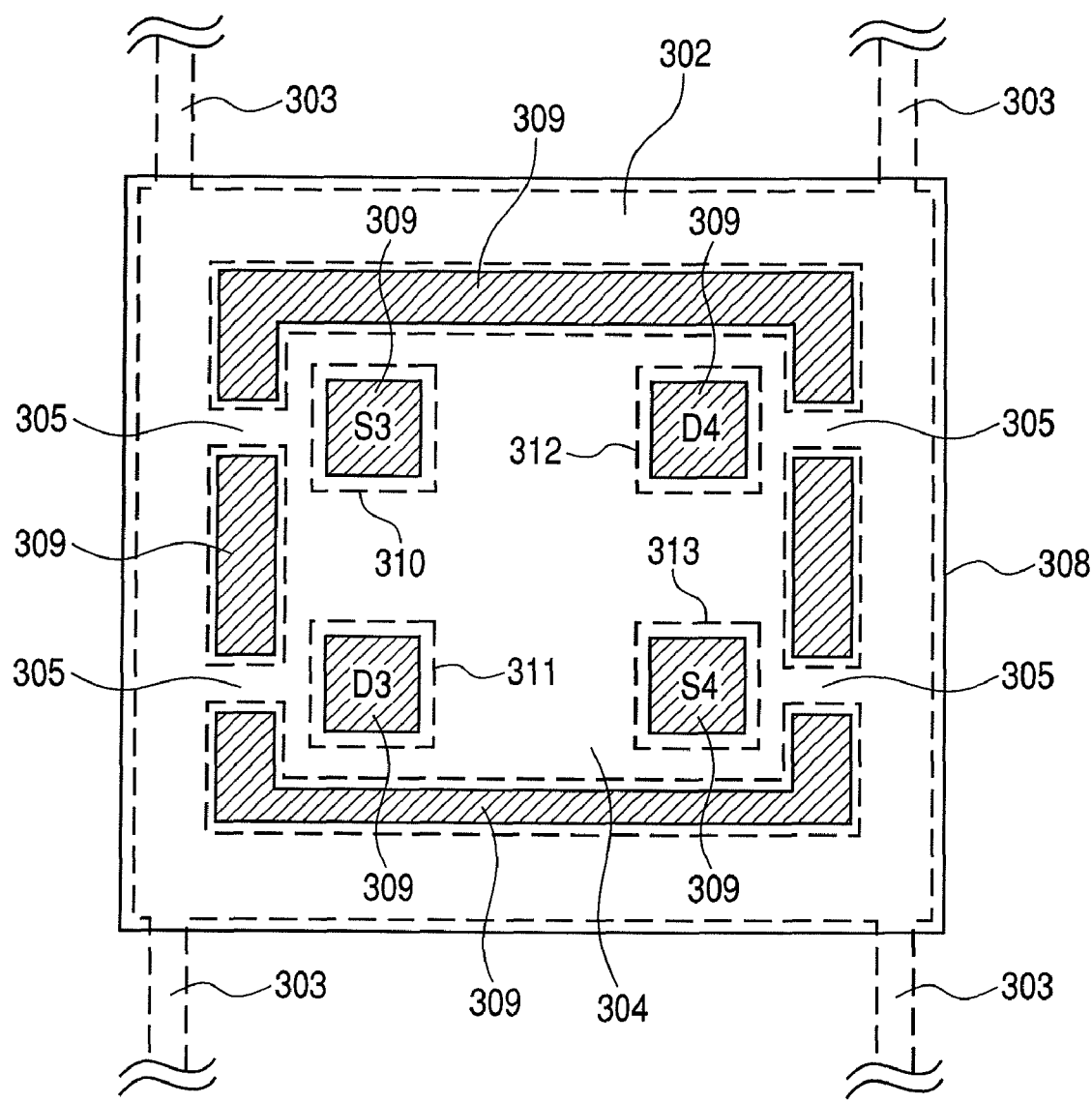
FIG. 9 is a top view for illustrating a sensor according to a fifth embodiment of the present invention.
Figure 10A:
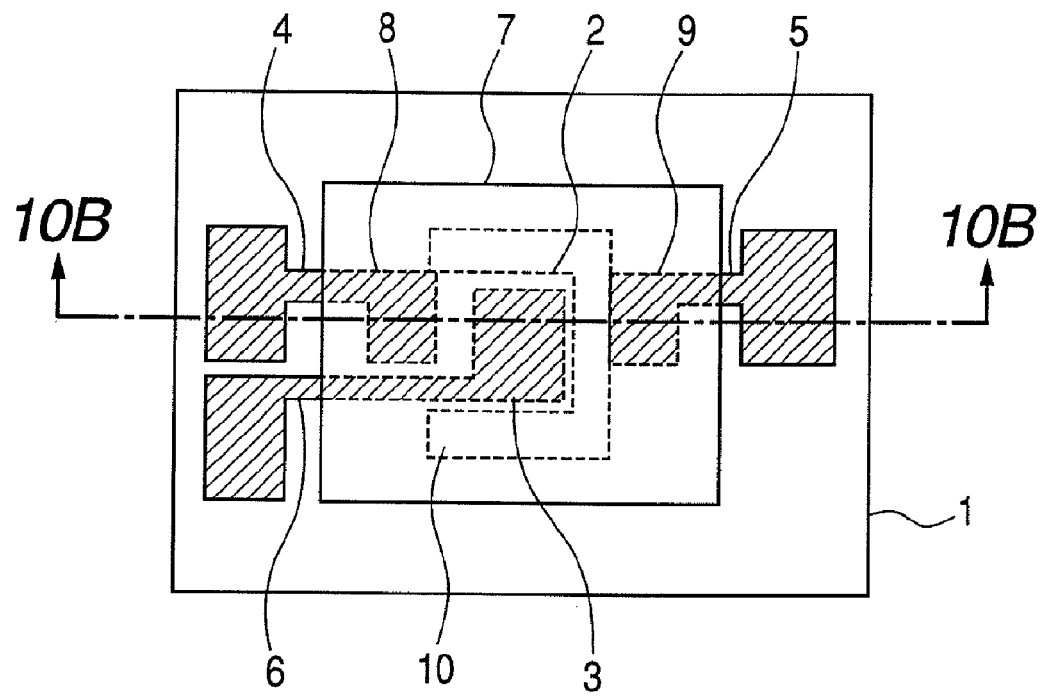
FIG. 10A is a top view for illustrating a sensor according to a related art.
Figure 10B:
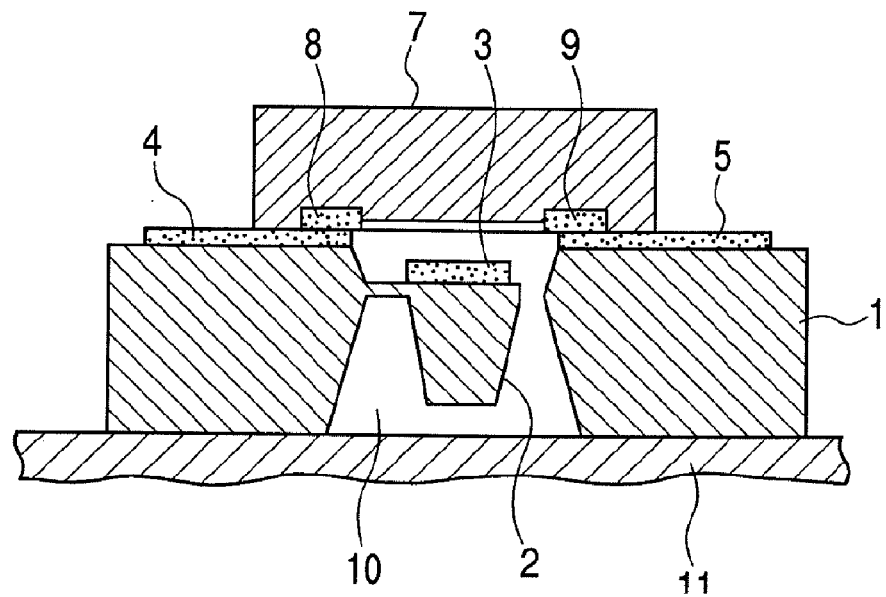
FIG. 10B is a cross-sectional diagram of that sensor (described above)
Figure 11:
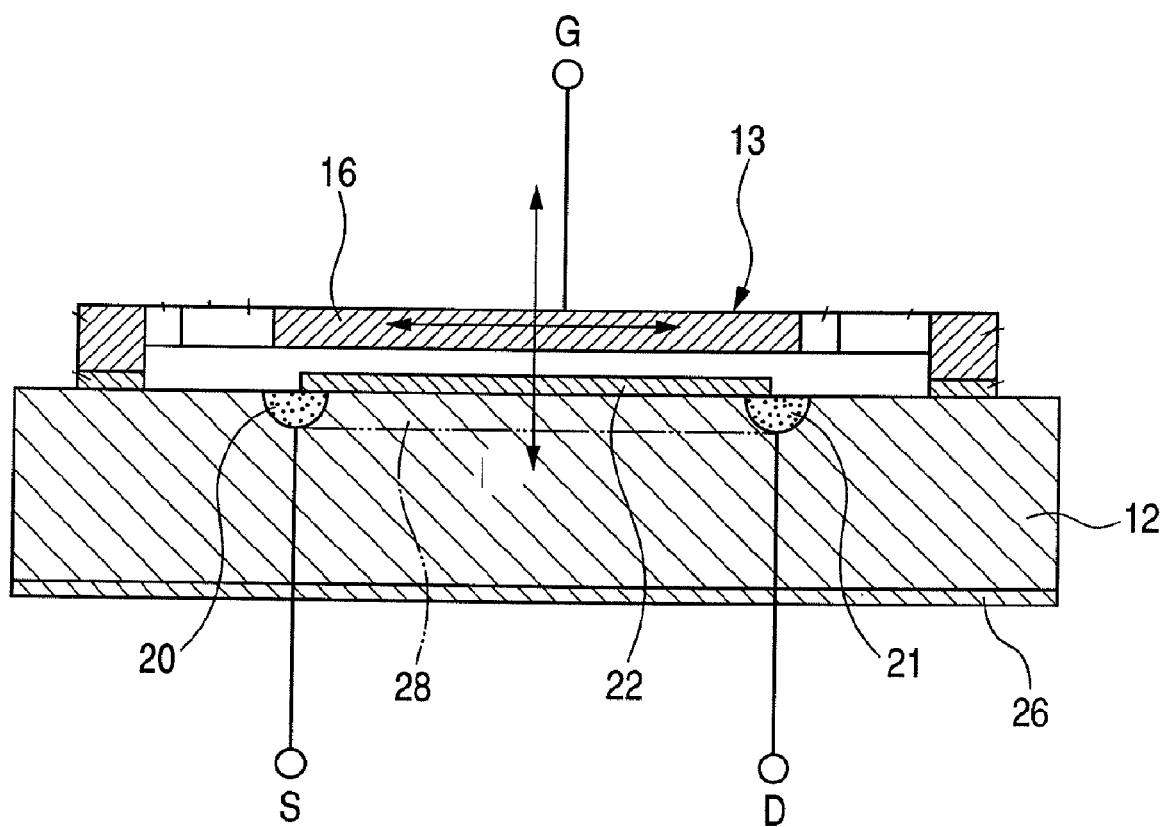
FIG. 11 is a cross-sectional diagram of a sensor according to another related art (described above).

FIG. 9 is a diagram viewed from the top surface of the reference movable element 308. The portion indicated by the solid line corresponds to the reference movable element 308. The portions indicated by the broken lines correspond to the reference movable element 302 connected to the reference movable element 308 through the spacer 307, the detection movable element 304, the supporting member 303, and the supporting member 305. Note that the comb-shaped structure of the drive unit (reference-oscillation-generating unit) 306 is omitted in FIG. 9.

In the fifth embodiment, the four impurity ion implanted regions 309 are each denoted by S3 and S4 (source regions) and D3 and D4 (drain regions) as shown in FIG. 9. Between each of the source regions (S3 and S4) and each of the drain regions (D3 and D4), a predetermined voltage is applied, and a predetermined potential is also provided to the detection movable element 304. In this case, currents flowing between each of the drain regions and each of the source regions include, as four combinations, "a current I1 flowing between the drain region D3 and the source region S3", "a current I2 flowing between the drain region D3 and the source region S4", "a current I3 flowing between the drain region D4 and the source region S3", and "a current I4 flowing between the drain region D4 and the source region S4".

Also in the fifth embodiment, the same principle is applied in which the detection movable element 304 oscillates due to the generation of a Coriolis force as in the fourth embodiment. Accordingly, also according to the fifth embodiment, it is possible to provide a gyroscope sensor capable of detecting an angular velocity about the axis H1 which is in parallel with the substrate surface, and about the axis V which is vertical to the substrate surface.

In the fifth embodiment with the above-mentioned structure, the four currents are detected, thereby enabling detection of the angular velocity about the axis which is in parallel with the substrate surface, and about the axis which is vertical to the substrate surface. Specifically, at the moment when the detection movable element 304 is moved upward of the face of FIG. 9, the currents I2 and I3 hardly change, the current I1 increases (or decreases), and the current I4 decreases (or increases). Further, at the moment when the detection movable element 304 is moved leftward of the space of FIG. 9, the currents I1 and I4 hardly change, the current I2 increases (or decreases), and the current I3 decreases (or increases). As a result, the oscillation of the detection movable element 304, which is generated by the Coriolis force due to the angular velocity about the above-mentioned axes, can be detected by using the SG-FET with high sensitivity. In addition, the currents are subjected to differential processing so as to detect a differential-type signal, thereby enabling detection of the displacement of the detection movable element 304 with high precision.

On the other hand, when the detection movable element 304 oscillates in the direction of the arrow Z, the changes of the four currents show substantially the same tendency. This is because the detection movable element 304 oscillates in the vertical direction with respect to the reference movable element 308, and the changes of the electric fields generated between each of the source regions and each of the drain regions show the same tendency. By utilizing the fact, the oscillation of the detection movable element 304 in the direction of the arrow Z can also be detected.

As described above, also according to the fifth embodiment, it is possible to provide the gyroscope sensor capable of detecting the angular velocity about the axis H1 which is in parallel with the substrate surface, and about the axis V which is vertical to the substrate surface, with high sensitivity and high precision.

Note that, in the above embodiments, the electrostatic actuator with the comb-shaped structure is used as the drive unit (reference-oscillation-generating unit) 306, but the drive unit it not limited thereto. Any drive unit such as an electrostatic actuator having a plate electrode, an electromagnetic actuator, and a piezoelectric actuator can be used as long as the drive unit can generate a desired oscillation.

Further, in the above embodiments, there is employed the spring structure in which the detection movable element 304 easily oscillate in two directions, that is, the direction of the arrow Y and the direction of the arrow Z, but the structure is not limited thereto. It is also possible to employ a spring structure in which the detection movable element 304 easily oscillates in a single direction (direction of the arrow Y or direction of the arrow Z).

In the specification of the present invention, the acceleration sensor and the gyroscope sensor have been described, but the scope of the present invention is not limited to the types and structures of the above-mentioned sensors. The present invention can be applied to other types of sensors such as a pressure sensor and a microphone, and to sensors having another structure. In a case of using the pressure sensor or the microphone for detecting the displacement of a membrane movable element, it is necessary to provide a complicated supporting structure for the membrane movable element. For this reason, when the present invention is applied thereto, the movable element has no limitation on the shape and the arrangement of the detecting unit, so the shape and the arrangement of the membrane movable element, and the supporting structure of the membrane movable element can be optimized, thereby achieving the sensor with extremely high sensitivity.

Further, the SG-FET of the above embodiments has a structure with no film formed on the electrode forming substrate (or every-region forming substrate) which is opposed to the movable element, but the structure of the SG-FET is not limited thereto. An insulating film such as an oxide film may be formed, or an extremely thin oxide film may be formed on a substrate surface in practice at the micro level. Further, the gyroscope sensor according to the above embodiments may have, in place of the FET structure, a structure in which an electrostatic coupling capacitance is formed between the movable element and the detection electrode as described in the first embodiment, thereby enabling detection of the change in electrostatic coupling capacitance.

Note that the impurity concentration and the resistivity described in the specification of the present invention are not limited thereto, but any numerical values thereof with which the effects of the present invention can be obtained can be applied to the present invention.

This application claims the benefit of Japanese Patent Applications No. 2006-326401, filed Dec. 4, 2006, and No. 2007-267308, filed Oct. 15, 2007, which are hereby incorporated by reference herein in their entirety.

The invention claimed is:

1. A sensor comprising:
a movable element; and
an opposing member, said movable element being opposed to at least part of said opposing member, and said sensor detecting a relative positional relationship between said movable element and said opposing member,
wherein said opposing member has an impurity-doped portion which is provided at one of an opposing portion of said opposing member, which is opposed to said movable element, and an adjoining portion of said opposing member, said adjoining portion adjoining said opposing portion to form a surface along said adjoining portion and said opposing portion, said surface facing a spacing, wherein at least part of the spacing is defined between said opposing member and said movable element, and
wherein at least a part of said impurity-doped portion is formed extending from a first surface of said opposing member, which first surface is opposed to said movable element, to a second surface of said opposing member opposite to said first surface, from which second surface an electrical wiring is led out.

2. A sensor according to claim 1, wherein said impurity-doped portion is insulated from a peripheral portion by an insulating portion in said opposing portion.

3. A sensor according to claim 1, wherein said movable element has an electric potential, and wherein the impurity-doped portion comprises a detection electrode formed in said opposing portion for forming a capacitance between said movable element and said detection electrode.

4. A sensor according to claim 1, wherein said movable element has an electric potential, wherein said impurity-doped portion comprises a source region and a drain region which are formed in two positions of said adjoining portion, and wherein said source region, said drain region, and a channel region of said opposing portion form a field-effect transistor.

5. A sensor according to claim 1, wherein:
said movable element forms a detection oscillator;
said opposing member forms a part of a reference oscillator;
said detection oscillator is oscillatably supported with respect to said reference oscillator;
said reference oscillator is oscillatably supported with respect to a supporting substrate; and
said sensor detects a Coriolis force due to an oscillation of said reference oscillator and an input of an angular velocity, based on a change of a relative positional relationship between said detection oscillator and said reference oscillator.

6. A sensor according to claim 1, further comprising a supporting member and an insulating film, and wherein said opposing member is held by said supporting member, with said insulating film between said supporting member and said opposing member.

7. A method of manufacturing a sensor comprising a movable element and an opposing member, the sensor detecting a relative positional relationship between the movable element and the opposing member which are provided with a spacing therebetween, the opposing member having an impurity-doped portion which is provided to one of an opposing portion which is opposed to the movable element and an adjoining portion which adjoins the opposing portion, and at least a part of the impurity-doped portion being formed on an opposite surface opposite to a surface which is opposed to the movable element, from which opposite surface an electrical wiring is led out, said method comprising:
a first step of preparing a substrate having semiconductor layers and insulating layers alternately laminated thereon;
a second step of etching a first semiconductor layer with a first mask patterning to form the movable element;
a third step of introducing impurity ions into a second semiconductor layer with a second mask patterning to form the impurity-doped portion of the opposing member;
a fourth step of etching an insulating layer sandwiched between the first semiconductor layer and the second semiconductor layer to form a spacing between the movable element and the opposing member; and
a fifth step of forming an electrical wiring to at least a part of the impurity-doped portion on an opposite surface opposite to a surface on which the movable element is provided.

8. A method of manufacturing the sensor according to claim 7, wherein said third step comprises diffusing impurity ions with heat from an opposite surface of the opposing member, which is opposite to a surface on which the movable element is provided, to form the source region and the drain region each of which is the impurity-doped portion.

9. A method of manufacturing the sensor according to claim 7, wherein said third step comprises etching from an opposite surface of the opposing member, which is opposite to a surface on which the movable element is provided, to form a depressed portion, followed by implanting impurity ions into a portion in which the depressed portion is formed to form the source region and the drain region each of which is the impurity-doped portion.

10. A method of manufacturing the sensor according to claim 7, wherein said second step comprises forming a through hole in the movable element, and wherein said third step comprises implanting impurity ions into the second semiconductor layer using as a mask a pattern of the through hole viewed from a top surface of the substrate prepared in the first step to form the source region and the drain region each of which is the impurity-doped portion.

* * * * *